United States Patent [19]

Hohenbuchler et al.

[11] Patent Number: 5,319,620

[45] Date of Patent: Jun. 7, 1994

[54] POCKET DICTATION MACHINE HAVING A REMOTE CONTROL DEVICE

[75] Inventors: Robert Hohenbuchler; Ernst Bayer, both of Vienna, Austria

[73] Assignee: U.S. Philips Corporation, New York, N.Y.

[21] Appl. No.: 828,320

[22] Filed: Jan. 29, 1992

[30] Foreign Application Priority Data

Mar. 1, 1991 [AT] Austria .................. A 436/91

[51] Int. Cl.⁵ .................. G11B 19/16; G11B 19/26
[52] U.S. Cl. .................. 369/29; 369/25
[58] Field of Search .................. 369/25, 29

[56] References Cited

U.S. PATENT DOCUMENTS

| | | | |
|---|---|---|---|
| 2,799,733 | 7/1957 | La Forest et al. | 369/29 |
| 4,426,738 | 1/1984 | Sato | 369/25 |
| 4,628,390 | 12/1986 | Motoyama et al. | 369/25 |

Primary Examiner—John J. Vrablik
Attorney, Agent, or Firm—William L. Botjer

[57] ABSTRACT

A pocket dictation machine (1), which is held in one hand in its dictation-recording mode and whose functions required in this mode can be started by a control member (23, 25), can also be operated in a second mode for the transcription of dictations, in which the functions required for this second mode can be started by remote control by a suitable control device (29) instead of by the control member.

13 Claims, 8 Drawing Sheets

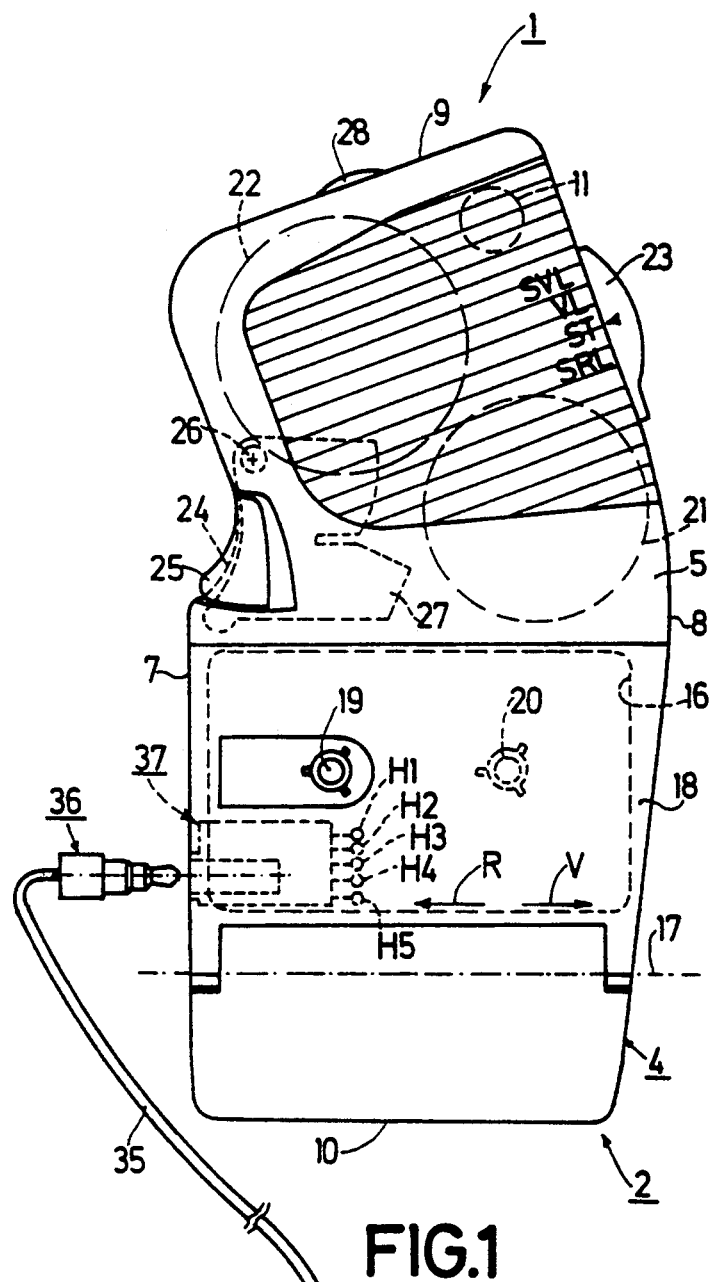
FIG.1
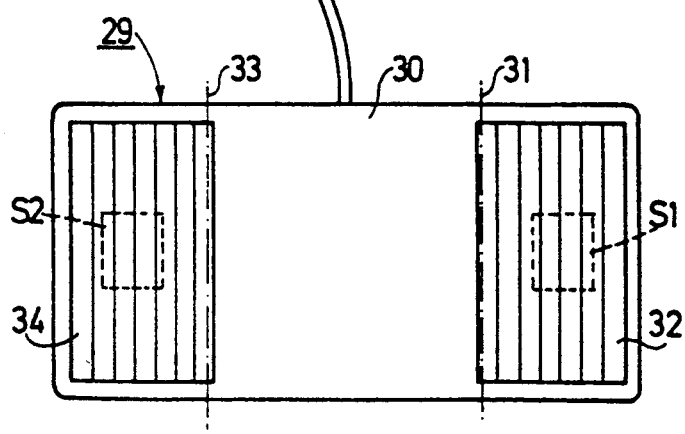

POCKET DICTATION MACHINE HAVING A REMOTE CONTROL DEVICE

BACKGROUND OF THE INVENTION

The invention relates to a pocket dictation machine which is held in one hand during operation in its mode for recording dictations and which is constructed to store and reproduce the speech signals corresponding to the dictations and appearing in a time sequence, which machine comprises a housing and a holder compartment, which is enclosed by the housing and is adapted to receive a storage medium for storing the speech signals in correlation with their time sequence, and is constructed to carry out a forward function and a reverse function, in which forward function the speech signals can be stored in the storage medium in correlation with their time sequence starting from a storage starting position, or speech signals previously stored in the storage medium in correlation with their time sequence can be read from the storage medium in correlation with their original time sequence, and in which reverse function it is possible to return to the storage starting position after storage or read-out in correlation with the original time sequence has been effected in a direction away from said storage starting position, which machine comprises at least one control member which can be switched by hand between at least two active positions, including one forward-active position and one reverse-active position, in which machine in its dictation-recording mode the forward function can be started by setting the relevant control member by hand to its forward-active position and the reverse function can be started by setting the relevant control member by hand to its reverse-active position.

Pocket dictation machines of the type defined in the opening paragraph have been known for a long time in a wide variety. For example, such a pocket dictation machine for magnetic tapes accommodated in cassettes and used for storing the speech signals corresponding to the dictations has been put on the market by the assignee under the type number LFH 0195. The oldest dictation machine of this type was already put on the market by the assignee in the year 1967.

These known pocket dictation machines are constructed only for recording dictations and the appropriate functions during which the successive speech signals are recorded and reproduced can be switched on by means of control members provided on these pocket dictation machines. The control members are constructed to be actuated while the pocket dictation machine is held in the hand. Therefore, such pocket dictation machines are neither intended nor suited for the transcription of dictations, i.e. for the production of type-written documents to take down the contents of the dictation, because the hands and fingers are then needed to operate a typewriter keyboard or a corresponding alphanumeric keyboard in order to transcribe the dictations and cannot be used for switching on the functions of a pocket dictation machine by hand. Therefore, the transcription of dictations recorded by means of a such pocket dictation machines, i.e. typing out of the dictation, is always effected by means of a separate machine, i.e. a transcription machine into which the storage medium storing the speech signals corresponding to the recorded dictations is loaded after its removal from such a known pocket dictation machine. Thus, for transcribing dictations recorded with such a known pocket dictation machine the storage medium should first be removed from the pocket dictation machine and, secondly, a separate transcription machine is needed into which this storage medium is inserted in order to transcribe the dictations.

Such transcription machines for magnetic tapes accommodated in cassettes for the storage of the speech signals corresponding to the dictations have also been known for a long time. Such a transcription machine, for example, has been put on the market by the assignee under the type number LFH 0304. Such transcription machines are so-called desk-top machines whose functions during transcription, which is functionally different from the operation during dictation recording, are switched on by remote control with the aid of a foot switch. With such transcription machines it is not possible to record dictations.

SUMMARY OF THE INVENTION

It is the object of the invention to modify a pocket dictation machine of the type defined in the opening paragraph in such way that the above-mentioned limitation of the possibilities of use as provided by the prior-art pocket dictation machines and the above-mentioned additional equipment required for the transcription of dictations recorded by means of prior-art pocket dictation machines are avoided and with minimal additional expenditure a pocket dictation machine with extended possibilities of use is obtained.

According to the invention this object is achieved in that in addition to the dictation-recording mode, in which the pocket dictation machine is held in one hand and its functions can be started by means of at least one control member, the pocket dictation machine 1 is also operable in a second mode for the transcription of dictations, in which the functions of the pocket dictation machine can be started by means of a control device instead of by means of the at least one control member, which control device can be influenced by a user of the pocket dictation machine at a location remote from the pocket dictation machine and by means of which at least a forward control signal and a reverse control signal can be produced, and the pocket dictation machine comprises a control circuit to which the forward control signal and the reverse control signal can be applied and by means of which in the second mode for the transcription of dictations, in the same way as with the relevant control member in the first mode for dictation recording, the forward function and the reverse function can be started by remote control in dependence upon the two control signals which can be produced by the control device.

In this way it is achieved very advantageously by very simple means that a pocket dictation machine in accordance with the invention can be employed not only in a first mode for dictation recording, in which mode the pocket dictation machine is held in one hand and in which its functions which are required for recording dictations and during which speech signals are recorded and reproduced can be switched on by manual actuation of the relevant control member, but can also be employed in a second mode for the transcription of dictations, in which mode the pocket dictation machine need not be held in the hand and in which its functions required for the transcription of previously recorded dictations, i.e. the forward function and the reverse function, can be switched on by remote control by means of a control device which can be influenced by a user of the pocket dictation machine at a location remote from the pocket dictation machine. This has the great advantage that a small easy-to-handle pocket dictation machine, which is held in the hand during the recording of dictations, can simply be handed to a typist after recording of the dictations without the storage medium for the speech signals corresponding to the dictations, such as a magnetic tape accommodated in a cassette, a disc-shaped record carrier suitable for electro-optically recording and reproducing speech signals, or a solid-state memory such as a semiconductor memory forming part of a printed-circuit card which is removable from the machine, having to be removed from the pocket dictation machine, after which the typist can operate the pocket dictation machine by remote control to transcribe the previously dictated and recorded dictations with the aid of the control device which cooperates with the pocket dictation machine in accordance with the invention. In this way a typist can transcribe the recorded dictation, i.e. take down the contents of the dictation, by means of the pocket dictation machine in accordance with the invention without a separate transcription machine being required. Thus, it is achieved that a small easy-to-handle pocket dictation machine constitutes not only a recording machine but also a transcription machine and thus performs the functions of an all-purpose dictation machine. As after completion of a dictation recorded at a dictation site a small easy-to-handle pocket dictation machine in accordance with the invention can be transferred very easily to a transcription site which is remote from the dictation site on account of its small size, its low weight, its mains-independent power supply and its simple and convenient operation, the advantage is obtained that a pocket dictation machine in accordance with the invention, which performs the functions of an all-purpose dictation machine, is actually used both for recording dictations and for transcribing dictations. Moreover, this enables a pocket dictation machine to be realised which can use a storage medium which in favourable manner is fixedly mounted in the machine and which constitutes a complete transcription machine in spite of the fact that the storage medium is fixedly mounted and is therefore not removable from the machine and cannot be loaded into a separate transcription machine.

It is to be noted that all-purpose dictation machines constructed as desk-top machines have been known for many years, which machines consequently cannot be held in the hand during recording but have to be placed on a supporting surface and whose functions in a first mode for the recording of dictations can be selected by means of buttons provided on a control device constructed as a remote-control microphone and by means of manually actuated keys provided on the machine itself, and whose functions in a second mode for the transcription of dictations can be selected by means of switches of a control device constructed as a foot-switch unit. Such an all-purpose dictation machine for use with magnetic tapes accommodated in cassettes for the storage of the speech signals corresponding to the dictations has, for example, been put on the market by the assignee under the type number LFH 0302. All all-purpose dictation machines constructed as large desk-top dictation machines can, in principle, be used not only as recording machines but also as transcription machines. However, in practice this possibility is hardly ever used because of the size, the comparatively large weight, the mains connection, the localised use, and the inconvenient and unpractical transportability of these all-purpose dictation machines, thereby restraining a simple and rapid displacement of such all-purpose dictation machines. This is also the reason why in practice the dictator always employs a separate all-purpose dictation machine of the desk-top type or a separate pocket dictation machine or both and the transcriber in addition employs a separate transcription machine of the desk-top type. In contrast, a small easy-to-handle pocket dictation machine can be moved simply and rapidly from one place to another without any problems, so that a pocket dictation machine in accordance with the invention, which constitutes an all-purpose dictation machine, in contradistinction to the prior-art desk-top dictation machines forming all-purpose dictation machines, is very suitable for recording dictations and, in addition, for transcribing dictations.

Moreover, it is to be noted that from EP 0,350,269 A2 a magnetic-tape recording and/or reproducing apparatus is known which is also small and easy-to-handle, which enables a plurality of functions to be selected by means of keys provided on the apparatus, and which is adapted to cooperate with a control device which can be actuated from a location which is remote from this apparatus. Both the apparatus and the control device are constructed in such a manner that the control device only enables the forward function in the apparatus to be switched on and switched off, so that the requirements for transcription are not met because it is essential for the transcription of prerecorded dictations that remote control of the reverse function is possible in order to enable parts of a dictation to be repeated.

The control device, which can be actuated from a location remote from the pocket dictation machine, can be for example an ultrasonic remote-control unit, in which case the remote-control device itself and also the location from where it is actuated are situated at a location remote from the pocket dictation machine, or it can be a voice-controlled control device, in which case it is also actuated from a location remote from the pocket dictation machine, i.e. from the mouth of the person uttering the control speech signals, who transcribes the dictations, but the control device itself may be situated inside the pocket dictation machine. It is found to be very advantageous if the pocket dictation machine is adapted to cooperate with a control device formed by a foot-switch unit comprising a connection lead terminated with a plug, the connection lead and the plug being adapted to transfer the forward control signal and the reverse control signal, and the pocket dictation machine comprises a socket for receiving the plug terminating the connection lead of the foot-switch unit, which socket is also adapted to transfer the forward control signal and the reverse control signal. This step, which is known per se, is also found to be advantageous in a pocket dictation machine in accordance with the invention because it is particularly simple.

The storage medium for the speech signals corresponding to the recorded dictations may be, for example a rotatable storage disc which can be inscribed and scanned magnetically or electro-optically or a semiconductor memory incorporated in a printed-circuit card adapted to be inserted into the holder compartment provided for this purpose in the pocket dictation machine, or it may be a semiconductor memory which is fixedly mounted in the holder compartment. At least in the case that a semiconductor memory is used the speech signals to be stored are subjected to an analog/digital conversion in known manner prior to their storage and are loaded into the semiconductor memory in digital form.

The invention can also be used advantageously in a pocket dictation machine whose holder compartment is adapted to receive a cassette accommodating a storage medium in the form of a magnetic tape which extends between two juxtaposed rotatable reel hubs, of which one hub forms a forward reel hub and the other a reverse reel hub, and which comprises two winding spindles which project into the holder compartment for the rotary drive of the two reel hubs, of which one spindle is a forward winding spindle and the other is a reverse winding spindle and which are both rotationally locked to at least one coaxial drive wheel each, which machine comprises a motor and a drive mechanism carried by a supporting device which is at least movable between at least a forward operating position and at least a reverse operating position, which drive mechanism comprises an intermediate wheel, which is rotatable by the motor, and by which, when the supporting device has been set to a forward operating position via the drive wheel which is coaxially connected to the forward winding spindle, the forward winding spindle can be driven to move the magnetic tape in a forward transport direction and, when the supporting device has been set to a reverse operating position via the drive wheel which is coaxially connected to the reverse winding spindle, the reverse winding spindle can be driven to move the magnetic tape in a reverse transport direction, and which comprises an actuating device which cooperates with the at least one control member and with the supporting device for the drive mechanism, by means of which actuating device in the first mode the supporting device for the drive mechanism can be set purely mechanically to at least a forward operating position by setting the relevant control member by hand to its forward-active position, and by means of which in the first mode the supporting device for the drive mechanism can be set purely mechanically to at least a reverse operating position by setting the relevant control member by hand to its reverse-active position.

Such pocket dictation machine have also been known for a long time. For example, the afore-mentioned pocket dictation machine put on the market by the Applicant under the type number LFH 0195 is a pocket dictation machine of a type as defined in the preceding paragraph.

In such a pocket dictation machine, in accordance with the invention, the drive mechanism, which is supported by the supporting device, which in the first mode is movable purely mechanically via the actuating device by hand actuation of the relevant control member, is adapted to be electromechanically movable in at least a part of the drive mechanism by remote control in dependence upon the two control signals produced in the second mode by the control device and applied to the control circuit, and in the second mode the drive mechanism drives the forward winding spindle when said drive mechanism has been moved electromechanically in dependence upon the forward control signal, and the drive mechanism drives the reverse winding spindle when said drive mechanism has been moved electromechanically in dependence upon the reverse control signal. In this way it is achieved that the drive mechanism, which is supported by the supporting device, which can be actuated in a purely mechanical way in the first mode of the pocket dictation machine, can in addition be actuated electromechanically at least in part, suitably in the second mode of the pocket dictation machine, so that in the first mode the drive mechanism, at least an appropriate part thereof, can be actuated by manual control and in the second mode by remote control in order to enable dictations to be recorded in the customary manner in the first mode and to be transcribed in the customary manner in the second mode.

In such a pocket dictation machine in accordance with the invention the electromechanical actuation of the drive mechanism in the second mode can be effected at least for a part thereof by means of, for example, at least one electromagnet or by means of a servo mechanism comprising a separate servo motor, an actuation of only a part of the drive mechanism or, by actuation of the supporting device, an actuation of the entire drive mechanism being possible electromechanically. In such a pocket dictation machine in accordance with the invention, whose drive system comprises a motor which has a reversible direction of rotation and which can be started in a forward direction of rotation and in a reverse direction of rotation opposite to the forward direction of rotation, as is known for example from the Applicant's above-mentioned pocket dictation machine bearing the type number LFH 0195, it is found to be very advantageous if in the second mode the motor can be started by remote control in its forward direction of rotation and in its reverse direction of rotation in dependence upon the two control signals produced by means of the control device and applied to the control circuit, and the drive mechanism, which is supported by the supporting device which in the first mode is movable purely mechanically by hand actuation of the relevant control member via the actuating device and which comprises at least one intermediate wheel drivable by the motor, at least in a part of the drive mechanism, is adapted to be electromechanically movable in dependence upon the direction of rotation of the motor started by remote control in the second mode and the direction of rotation of the intermediate wheel which is drivable by the motor. In this way it is achieved that the objective is achieved without an electromagnet or a servo mechanism and the electromechanical actuation of the drive mechanism, at least of a part thereof, is effected by means of the motor which is available anyway by an appropriate choice of the direction of rotation of this motor.

It is to be noted that the step of actuating at least a part of a drive mechanism depending upon the direction of rotation of a motor driving the drive mechanism is known per se. However, it is not known to actuate at least a part of a drive mechanism, which is supported by a supporting device which can be actuated purely mechanically by means of a control member, also electromechanically depending upon the direction of rotation of a motor.

In such a pocket dictation machine in accordance with the invention it is also found to be particularly advantageous that, when in the first mode the supporting device has been set purely mechanically to a forward operating position via the actuating device by hand actuation of the relevant control member, the drive mechanism, which is carried by the supporting device, is in addition electromechanically movable, at least in a part of the drive mechanism, in the first mode in dependence upon the forward direction of rotation of the motor started by the control member which has been set to its forward-active position, the drive mechanism after such an electromechanical actuation thereof in the first mode driving the forward winding spindle via the drive wheel, which is coaxially connected to the forward winding spindle. In this way the electromechanical actuation possibility of at least a part of the drive mechanism is utilised not only in the second mode of operation but suitably also in the first mode of operation of the pocket dictation machine, which is advantageous for a minimal actuating stroke and a minimal actuating force for the relevant control member, the actuating device which can be actuated thereby, and the supporting device for the drive mechanism.

Moreover, it is found to be particularly advantageous with such a pocket dictation machine in accordance with the invention if in the second mode, in addition to the first mode, the supporting device is movable purely mechanically at least to a forward operating position via the actuating device in that the relevant control member has been set to its forward-active position by hand, and there is provided at least one inhibit switch which can be changed over by hand, whose change-over prevents the forward function to be started in the second mode when the relevant control member has been set to its forward-active position by hand. Since the supporting device for the drive mechanism is set to a forward operating position not only in the first mode but also in the second mode of operation the desired result is advantageously achieved with a comparatively small actuating stroke for the electromechanical actuation of at least a part of the drive mechanism. Changing over the inhibit switch in the second mode prevents the forward function from being actually started by manually setting the relevant control member to its forward position in the pocket dictation machine, because in the second mode the functions of the pocket dictation machine should be started only by the remote control device.

The supporting device for the drive mechanism can be constructed, in known manner, from a rest position to its operating positions in opposite actuating directions. However, it is found to be advantageous if the supporting device for the drive mechanism is constructed to be set to a rest position and from the rest position to its operating positions in only one actuating direction. This is advantageous for a simple definition of the rest position of the supporting device and for a simple actuation of the supporting device.

With respect to a drive mechanism which is supported by the supporting device, which can be set purely mechanically from one rest position to its operating positions in one actuating direction only and can be set purely mechanically to a forward operating position in both modes of operation, of which mechanism at least a part can be actuated electromagnetically depending on the current direction of rotation of the motor, it is found to be particularly advantageous if the drive mechanism, which is carried by the supporting device, which is movable purely mechanically from a rest position into both its operating positions in only one actuating direction and which is movable purely mechanically to at least a forward operating position in both modes, and is movable electromechanically in both modes, at least in a part of the drive mechanism, in dependence upon the instantaneous direction of rotation of the motor, comprises a drive shaft, which is rotatably supported on the movable supporting device and to which the intermediate wheel, which is rotatable by the motor, is coaxially connected and rotationally locked, and an intermediate toothed wheel, which is coaxially connected and rotationally locked to the drive shaft and which can drive a reverse toothed wheel provided as the drive wheel which is coaxially connected to the reverse winding spindle, when the supporting device for the drive mechanism has been moved to a reverse operating position via the actuating device in that the relevant control member has been set by hand to its reverse-active position, and the motor, which has been started in its forward direction of rotation by the control member which has been set to its reverse-active position, and an intermediate friction wheel which forms an electromechanically movable part of the drive mechanism and which is movable in dependence upon its direction of rotation, which intermediate friction wheel is rotatably supported on a friction-wheel carrier, which is pivotable about the drive shaft, and is kept pressed against the drive shaft and is drivable thereby in frictional engagement, by means of which friction wheel a forward friction wheel, provided as the drive wheel which is coaxially connected to the forward winding spindle, can be driven in the first mode when the supporting device for the drive mechanism has been moved to a forward operating position via the actuating device in that the relevant control member has been set to its forward-active position and the motor has been started in its forward direction of rotation by the control member which has been set to its forward-active position, and in the second mode when the supporting device has been moved towards a forward operating position via the actuating device in that the relevant control member has been set to its forward-active position, and the motor has been started in its forward direction of rotation by remote control via the control circuit, and by means of which a reverse friction wheel, which is connected coaxially to the reverse winding spindle, can be driven in the second mode when the supporting device which has been moved towards a reverse operating position via the actuating device in that the relevant control member has been set to its forward-active position, and the motor has been started in its reverse direction of rotation by remote control via the control circuit, and which in the first mode is kept disengaged from the forward friction wheel by separate blocking means when the supporting device for the drive mechanism, which has been moved towards a reverse operating position via the actuating device in that the relevant control member has been set to its reverse-active position by hand, and the motor has been started in its forward direction of rotation by the control member which has been set to its reverse-active position. This results in a particularly simple very compact and reliable construction.

With respect to the bearing construction and mounting of the intermediate friction wheel it is found to be particularly advantageous if the friction-wheel carrier is formed by a lever which is pivotable about a pivot which extends parallel to the drive shaft, there is provided an intermediate carrier for the friction-wheel carrier, which intermediate carrier is pivotable about the drive shaft and pivotally supports the friction-wheel carrier, and a spring acts upon the intermediate carrier and upon the friction-wheel carrier to tension the two said carriers relative to one another, which spring determines the pressure with which the intermediate friction wheel, which is rotatably supported on the friction-wheel carrier, is kept pressed against the drive shaft. This is also advantageous in order to obtain a compact construction and, in addition, to enable the pressure with which the intermediate friction wheel is pressed against the drive shaft to be accurately defined by a suitable choice of the spring construction.

With such a drive mechanism it is found to be very advantageous if the separate blocking means for keeping the intermediate friction wheel disengaged from the forward friction wheel comprise an actuating projection of the actuating device, which projection is adapted to cooperate with the intermediate carrier for the friction-wheel carrier. This is also advantageous for a very simple construction.

With respect to the lever provided as friction-wheel carrier it is found to be very advantageous if the lever provided as the friction-wheel carrier has the shape of a frame and comprises two lever portions which extend transversely of the drive shaft and in each of which a shaft end is rotatably supported for the double support of the intermediate friction wheel. This is advantageous for supporting the intermediate friction wheel in a stable and effective manner which remains constant throughout its long lifetime.

The movable supporting device for the drive mechanism can be constructed as a slidably guided slide or as a simple pivotable lever. However, it is found to be particularly favourable if the movable supporting device for the drive mechanism is formed by a lever which is pivotable about a pivot extending parallel to the drive shaft of the drive mechanism and which has the shape of a frame and comprises two lever portions which extend transversely of the drive shaft and in each of which the drive shaft is rotatably supported for the double support of said shaft. This is advantageous for supporting the drive shaft in an accurate, stable and effective manner which remains constant throughout a long lifetime.

In order to drive the intermediate wheel which can be driven by the motor it is found to be particularly advantageous if the intermediate wheel of the drive mechanism is constructed as a pulley, a further pulley is rotationally locked to the shaft of the motor, and the two pulleys are coupled in driving engagement by a belt wrapped around the two pulleys. This is advantageous for a proper intermediate-wheel drive which remains substantially constant independently of the position of the drive mechanism and for a construction which is as compact as possible.

In a pocket dictation machine comprising a supporting device set to its rest position from which it is movable in only one actuating direction and comprising a drive mechanism whose intermediate wheel is driven via a belt it is found to be particularly advantageous if there is provided a positioning stop adjacent the supporting device for the drive mechanism when said device is in its rest position, against which stop the supporting device is urged under the influence of the tension of the belt to define the rest position of said supporting device. In this way the rest position of the supporting device and hence that of the drive mechanism are defined in a particularly simple manner.

In a pocket dictation machine comprising an inhibit switch this switch for preventing the forward function from being started when the relevant control member is manually set to its forward position may be constituted by a separate switch which can be actuated independently. Such a separate switch has the drawback that if changing over of this switch is omitted the forward function may be started inadvertently. Therefore, it is found to be particularly advantageous if the manually switchable inhibit switch is arranged in the socket provided for receiving the plug terminating the connection lead of the foot-switch unit and the inhibit switch arranged in the socket can be changed over by means of the plug when the plug is inserted by hand to obtain the second mode. This has the advantage that the inhibit switch is changed over automatically when the foot-switch plug is inserted into the socket provided for this purpose on the machine, i.e. already when preparing to proceed to the second mode and not at a later instant when changing over may be forgotten.

BRIEF DESCRIPTION OF THE DRAWING

The invention will be described in more detail hereinafter on the basis of an embodiment which is shown in the drawings but to which the invention is not limited.

FIG. 1 is a substantially full-scale plan view of an embodiment of a pocket dictation machine which in its dictation-recording mode is held in one hand and can be actuated by means of two control members and which in a second mode for the transcription of dictations need not be held in the hand and can be actuated by means of a foot switch, which is shown diagrammatically and scaled-down in FIG. 1 and which can be electrically connected to the pocket dictation machine by means of a plug via a socket.

DESCRIPTION OF THE PREFERRED EMBODIMENTS

Figure 2:
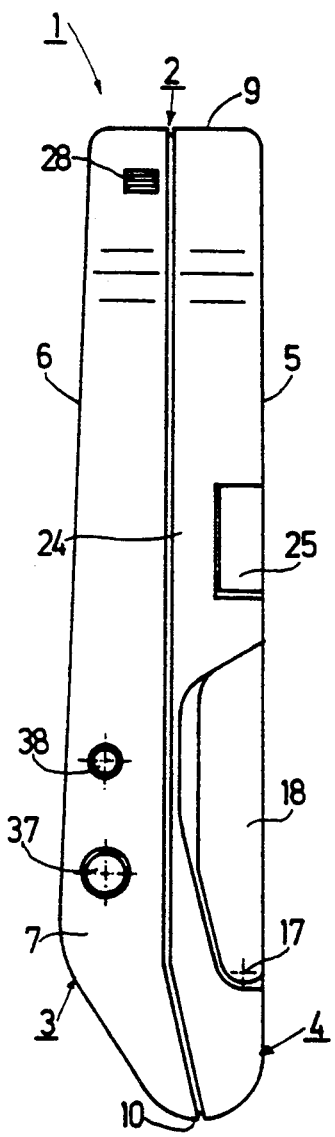
FIG. 2 is a side view of the pocket dictation machine of FIG. 1 with the socket for connection of the foot switch.
Figure 3:
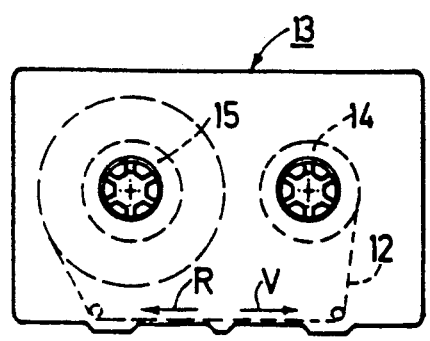
FIG. 3 is a plan view of a cassette adapted to cooperate with the pocket dictation machine shown FIGS. 1 and 2, which cassette accommodates a magnetic tape extending between two juxtaposed reel hubs for the storage of the speech signals corresponding to the dictations.

FIG. 1 shows a pocket dictation machine 1 which is held in one hand in its dictation-recording mode. The pocket dictation machine 1 has a substantially elongate slightly angular housing 2 comprising a base-side housing section 3 and a cover-side housing section 4. The two housing sections 3 and 4 form a cover wall 5, a base wall 6, a first longitudinal side wall 7 and a second longitudinal side wall 8, and a first transverse side wall 9 and a second transverse side wall 10.

The pocket dictation machine 1 is constructed to store and reproduce time-sequential speech signals corresponding to the dictations. In order to convert the speech sounds into the speech signals to be stored the machine 1 comprises a built-in microphone 11. The pocket dictation machine 1 can be provided with a storage medium 12 in order to store the speech signals in correlation with their time sequence. In the present case the storage medium 12 takes the form of a magnetic tape accommodated in a cassette 13. In the cassette 13 the magnetic tape 12 extends between two juxtaposed rotatable reel hubs 14 and 15 which are rotatably supported and of which one reel hub 14 constitutes a forward reel hub and the other reel hub 15 constitutes a reverse reel hub.

For receiving the cassette 13 the pocket dictation machine 1 comprises a holder compartment 16 into which a cassette 13 can be inserted and which can be closed by means of a cover 18 which is pivotable axis 17. For driving the two reel hubs 14 and 15 in a cassette 13 the pocket dictation machine 1 comprises two winding spindles 19 and 20 which project into the holder compartment 16 and which engage with the two reel hubs 14 and 15 when a cassette 13 is inserted into the holder compartment 16. To drive the two winding spindles 19 and 20 the pocket dictation machine 1 comprises a drive system, not shown in FIG. 1, which comprises a motor 21 shown diagrammatically in FIG. 1, which motor can drive the two winding spindles 19 and 20 in opposite directions of rotation. Of the two winding spindles the winding spindle 20 is a forward winding spindle by means of which the magnetic tape 12 can be driven in a forward direction of transport indicated by the arrow V in FIGS. 1, 3, 5 and 6. The winding spindle 19 is a reverse winding spindle by means of which the magnetic tape 12 can be driven in a reverse direction of transport indicated by the arrow R in FIGS. 1, 3, 5, 7 and 8.

The pocket dictation machine 1 is constructed to perform a forward function, in which the magnetic tape 12 can be driven in the forward direction V, in which starting from a tape starting position speech signals can be stored or reproduced, and a reverse function, in which the magnetic tape 12 can be driven in the reverse direction R to return to said tape starting position after the storage or reproduction of speech signals. This construction includes at least one magnetic recording/reproducing head, not shown in FIG. 1, which is in scanning contact with the magnetic tape 12 when the cassette 13 is in the pocket dictation machine 1. By means of this magnetic head the speech signals supplied by the microphone, processed by a recording circuit and applied to the magnetic head are stored on the magnetic tape 12 in correlation with their time sequence. By means of this magnetic head speech signals thus stored are also scanned from the magnetic tape 12 in correlation with their time sequence and, via a reproducing circuit, they are applied to a built-in loudspeaker 22 of the pocket dictation machine 1 for acoustic reproduction. Said construction also includes the drive system which has been mentioned above and which will be described in more detail hereinafter, by means of which system both during recording and during scanning, i.e. during reproduction of the speech signals, the magnetic tape 12 is moved past the magnetic head in the forward transport direction V. In order to return to the beginning of a specific passage after storage or reproduction of this speech-signal passage said drive system moves the magnetic tape 12 past the magnetic head in the reverse transport direction R.

At the location of its second longitudinal side wall 8, viz. at the part thereof which faces the first transverse side wall 9, the pocket dictation machine 1 comprises a control member 23 which can be actuated by the thumb of one hand. This control member 23 is constructed as a slide switch which is guided so as to be movable in the longitudinal direction of the second longitudinal side wall 8 and which is movable between four different operating positions, this control member enabling one operating function of the pocket dictation machine 1 to be switched on in each of its operating positions. In a direction away from the first transverse side wall 9 the successive operating positions of the slide switch 23 successively correspond to the operating functions "fast forward", normal forward", "stop", and "fast reverse". The "normal forward" operating function is the previously mentioned forward function and the "fast reverse" operating function is the previously mentioned reverse function. In its first mode for dictation recording the pocket dictation machine 1 can be set to the "normal forward" function by manually setting the slide switch 23 to its forward operating position and to the "fast reverse" function by manually setting it to its reverse operating position.

At the location of a throat-like portion 24 of the first longitudinal side wall 7 the pocket dictation machine 1 has a further control member 25 for switching on and switching off the recording function of the machine 1. The further control member 25 is constructed as a pushbutton, which is pivotable about a pivotal spindle 26 and which is held in its rest position shown in FIG. 1 by means of a return spring, not shown. The further control member 25 has a plate-shaped actuating member 27 by means of which, in a manner not shown, a recording-/reproducing switch can be actuated and further switching functions required for starting the recording function can be carried out. As is known, the push-button 25 should be actuated in addition to the slide switch 23 in order to enable speech signals to be recorded on a magnetic tape. It is to be noted that at the location of the first transverse side wall 9 a knurled wheel 28 projects from the interior of the machine through an opening 33 in this transverse side wall, by means of which wheel a potentiometer for controlling the reproduction volume can be operated.

In addition to the first mode for recording dictations, in which mode the pocket dictation machine is held in one hand and its operating functions required for recording dictations can be started by means of the two control members 23 and 25, the pocket dictation machine 1 has a second mode for the transcription of dictations, in which mode the appropriate functions of the pocket dictation machine can be activated by means of a control device instead of by means of the control members, which device is operable from a location which is remote from the pocket dictation machine. For this purpose the pocket dictation machine 1 is provided with such a control device for controlling the pocket dictation machine 1. As will be described hereinafter, the control device is adapted to start a forward control signal and a reverse control signal.

In the present case said control device is constituted by a foot-switch unit 29, shown diagrammatically in FIG. 1. At the location of its upper wall 30 the foot-switch unit 29 comprises a first plate-shaped actuating member 32 which is pivotable about a pivotal axis 31, which can be actuated against spring force with one foot, and by means of which a first switch S1 shown symbolically in FIG. 1 can be activated. At the location of its upper wall 30 the foot-switch 29 further comprises a second plate-shaped actuating member 34 which is pivotable about a pivotal axis 33, which can be actuated against spring force with one foot, and by means of which a second switch S2, also shown symbolically in FIG. 1, can be activated. The forward control signal can be produced by actuation of the first switch S1 and the reverse control signal can be produced by actuation of the second switch S2. The two switches S1 and S2 are connected to a connection lead 35 provided with a plug 36. In the present case the connection lead 35 and the plug 36 are of the three-pole type.

The pocket dictation machine 1 is constructed for cooperation with the foot-switch unit 29, whose connection lead 35 and plug 36 are adapted to transfer the forward control signal and the reverse control signal. As is shown diagrammatically in FIG. 1, the pocket dictation machine 1 has a socket 37 for receiving the plug 36 connected to the lead 35 of the foot-switch unit 29, which socket is also adapted to transfer the forward control signal and the reverse control signal. As can be seen in FIGS. 1 and 2, the socket 37 is arranged at the location of the first longitudinal side wall 7 of the pocket dictation machine 1. Adjacent this socket 37 there is a further socket 38 adapted to receive a further plug, not shown, to connect an external direct voltage source to the pocket dictation machine 1.

The pocket dictation machine 1 comprises a control circuit to which the forward control signal and the reverse control signal are applied and with which the forward function and the reverse function can be started, in the same way as in the first mode for recording dictations by means of the control member 23, by remote control in the second mode for the transcription of dictations depending on the control signals generated by the control device constituted by the foot-switch unit 29. A circuit arrangement shown in FIG. 4 and comprising the above control circuit will be described in more detail hereinafter.

Figure 4:
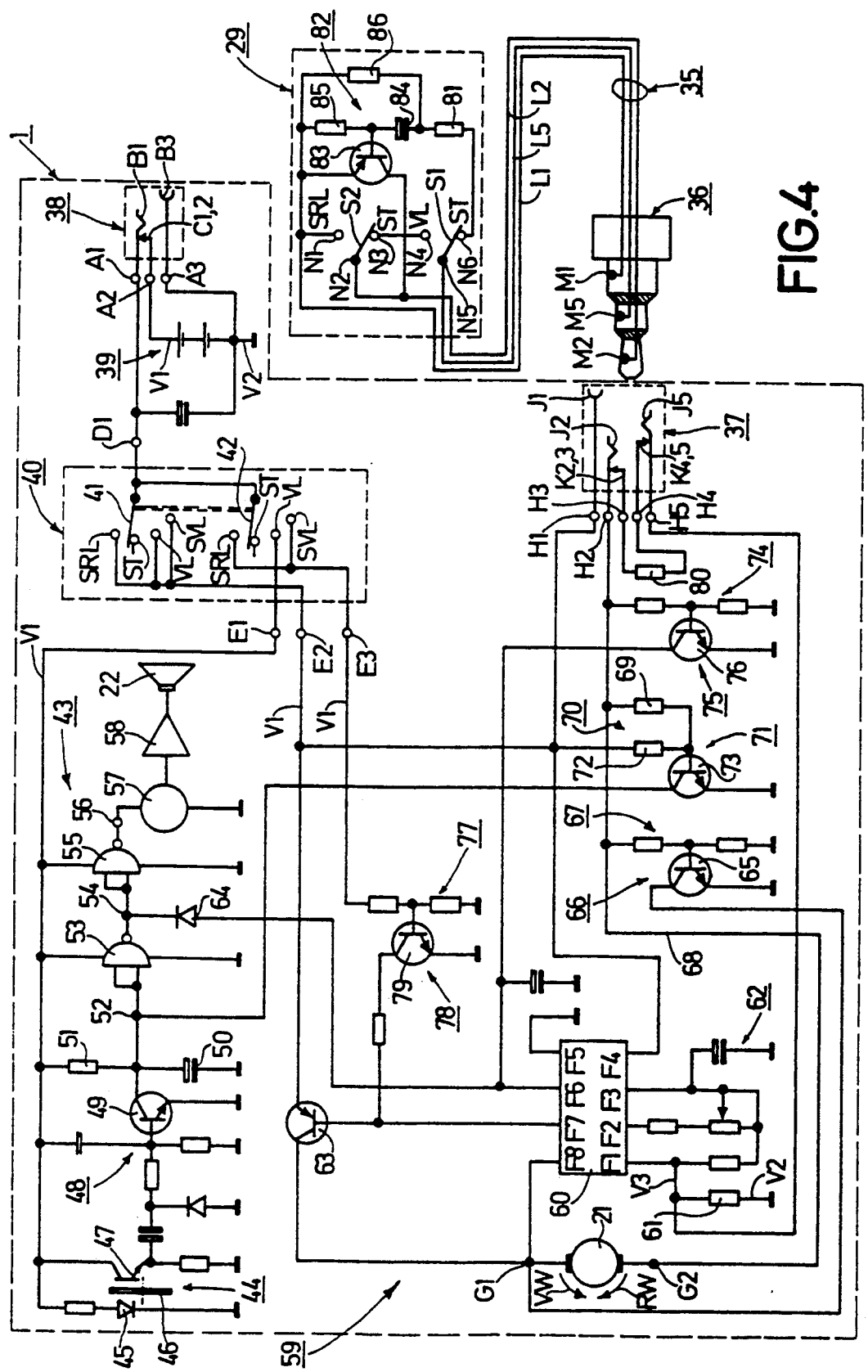
FIG. 4 is a circuit diagram showing a part of the circuit of the pocket dictation machine shown in FIGS. 1 and 2, and the circuit of the foot switch connected to this dictation machine.

In FIG. 4 the pocket dictation machine 1 and the foot-switch unit 29 are shown symbolically in broken lines. For the electric power supply of the pocket dictation machine 1 the machine accepts two series-connected batteries 39 supplying a positive supply voltage V1 of +3 V relative to earth potential V2. The electric power supply of the machine 1 can also be provided by an external direct voltage source which can be connected to the socket 38 via a plug connected to this source. The socket 38 has three terminals A1, A2 and A3. When the plug is inserted into the socket 38 two plug contacts mate with two socket contacts B1 and B3 and a switch C1, 2 arranged in the socket 38 is set to its open state by the plug, so that the batteries 39 are disconnected. In the case of internal power supply the supply voltage V1 is applied from the batteries 39 to an input terminal D1 of a function switch 40 via the terminal A2, the switch C1, 2 and the terminal A1 of the socket 38, which function switch has two switch contacts 41 and 42 which are changed over together. In the case of external power supply the supply voltage V1 is applied to the input terminal D1 of the function switch 40 via the contact B1 and the terminal A1 of the socket 38. The function switch 40 can be changed over by means of the slide switch 23, which will be set forth in the description with reference to FIGS. 5 to 8. Accordingly, the four switch positions of the two switch contact 41 and 42 are referred to as SRL for "fast reverse", ST for "stop", VL for "normal forward", and SVL for "fast forward". The function switch 40 has three output terminals E1, E2 and E3 via which the supply voltage V1 can be applied to specific circuit sections of the circuit arrangement shown in FIG. 4 depending on the switch positions of the two switch contacts 41 and 42.

The supply voltage V1 can be applied to a circuit section 43 via the first input terminal E1 of the function switch 40, which section can generate a control signal for switching off the motor 21 or the machine 1 if the reverse winding spindle 19 stops, i.e. when an end of the magnetic tape accommodated in a cassette is reached, in the case of tape breakage, or in the case that inadvertently no cassette has been inserted into the machine. The end-stop circuit section 43 comprises a photoelectric light-barrier 44, which comprises a photodiode 45, a rotatable shutter 46 connected to the reverse winding spindle 19 for periodically interrupting the light path, and a phototransistor 47. The phototransistor 47 generates pulses in accordance with the rotation of the shutter 46, which pulses are applied to a first transistor stage 48, whose transistor 49 is turned on in the rhythm of the pulses. A capacitor 50, which is charged via a resistor 51, is discharged via the transistor 49 in the rhythm of the pulses. As long as the reverse winding spindle 19 rotates the capacitor 50 is discharged periodically, causing a low potential L, namely the earth potential V2, to appear on the output 52 of the first transistor stage 48. The output 52 is connected to both inputs of a NAND gate 53, on whose output 54 a high potential H appears, i.e. the supply voltage V1, as long as the reverse winding spindle 19 rotates. The output 54 is connected to the two inputs of a further NAND gate 55, on whose output 56 a low potential L appears as long as the reverse winding spindle 19 rotates. A warning signal generator 57 is connected to the output 56, which generator can generate a warning signal which can be applied to the loudspeaker 22 of the machine 1 via an amplifier stage 58 for acoustic reproduction.

When the reverse winding spindle 19 stops the pulses generated by means of a light barrier 44 appear no longer, so that periodic discharging of the capacitor 50 ceases. The capacitor 50 is then charged, causing a high potential H to appear on the output 52 of the first transistor stage 48. This results in a low potential L on the output 54 of the first NAND gate 53, by means of which the pocket dictation machine can be switched off electrically, and in a high potential H on the output 56 of the second NAND gate 55. Said high potential turns on the warning-signal generator 57 and consequently the loudspeaker 22 produces a warning sound to inform the user of the machine acoustically that the machine has been switched off upon reaching the end of tape, that tape breakage has occurred, or that no cassette has been inserted.

In principle, the supply voltage V1 can be applied to the afore-mentioned control circuit, which bears the reference numeral 59 in FIG. 4, via the second output terminal E2 of the function switch 40. The forward control signal and the reverse control signal, which can both be produced by means of the foot-switch unit 29, can be applied to the control circuit 59. By means of the control circuit 59 the functions of the pocket dictation machine 1 can be started, which in the present machine means that by means of the control circuit 59 the motor 21 of the machine can be started selectively in one of the opposite directions of rotation, i.e. in a forward direction of rotation indicated by the arrow VW and corresponding to the anti-clockwise direction, or in a reverse direction of rotation indicated by the arrow RW and corresponding to the clockwise direction.

The control circuit 59 comprises a speed control circuit 60 for the motor 21, which circuit is constructed as an integrated device and which is commercially available, for example, under the type number AN6612S. The device 60 has eight terminals F1 to F8. A resistor 61 having a low resistance is connected to the terminal F1 and constitutes a measurement resistor by means of which the current through the motor 21 can be measured. The instantaneous motor current produces a proportional measurement voltage V3 across the measurement resistor 61, which voltage is substantially of the order of magnitude of 10 to 20 mV, i.e. only slightly above earth potential V2. The measurement voltage is applied to the terminal F1 of the speed control circuit 60 as the so-called actual value. A network 62 comprising two fixed resistors, one variable resistor and one capacitor is connected to the terminals F2 and F3. By means of the variable resistor of this network 62 it is possible to set a desired nominal speed of the motor 21 and to compensate for the effect of motor tolerances on the speed. The terminal F4 is connected to the output terminal E2 of the function switch 40 to apply the supply voltage V1 to the device 60. The terminal F5 is connected to earth potential V2. The terminal F8 is connected to a first motor terminal G1, thereby enabling another actual-value parameter which depends on the voltage across the motor 21 to be applied to the speed control circuit 60. The terminal F7 forms a control output on which the speed control circuit supplies a control signal which serves for controlling the conduction of a motor-supply transistor 63, which has its base connected to the terminal F7, its emitter to the output terminal E2 of the function switch 40, and its collector to the first motor terminal G1. The terminal F6 serves as the control input via which an internal transistor of the speed control circuit 60 can be driven. The internal transistor enables the motor supply transistor 63 to be driven via the terminal F7. The motor supply transistor 63 is cut off when the terminal F6 is connected to earth potential V2, which is possible for example from the output 54 of the NAND gate 53 of the circuit section 43 via a protective diode 64. The protective diode 64 prevents a high potential H appearing on the output 54 from reaching the terminal F6 of the device 60, which would result in the motor supply transistor 63 being driven into full conduction.

A transistor 65 of a second transistor stage 66 has its collector connected to the first motor terminal G1. The second transistor stage 66 serves to enable the first motor terminal G1 to be connected to earth potential V2. The base voltage divider 67 of the second transistor stage 66 is connected to a line 68 which is connected to a second motor terminal G2.

A resistor 69 of a base voltage divider 70 of a third transistor stage 71 is also connected to the line 68 connected to the second motor terminal G2. The second resistor 72 of the base voltage divider 70 is connected to the output terminal E2 of the function switch 40. The transistor 73 of the third transistor stage 71 has its collector connected to the output 52 of the first transistor stage 48 of the circuit section 43. The third transistor stage 71 serves to disable the circuit section 43 for generating a control signal for switching off the machine and the motor 21. This is effected in that the transistor 73 is turned on, so that the output 52 is held at a low potential L via the transistor 73, also if no pulses from the light barrier 44 are received and consequently the capacitor 50 is no longer discharged via the transistor 49.

Moreover, the base voltage divider 74 of a fourth transistor 75 is connected to the line 68. The transistor 76 of this fourth transistor stage 75 has its collector connected to the terminal F6 of the speed control circuit 60. When the transistor 76 is turned on this results in the terminal F6 being connected to earth potential V2, causing the motor supply transistor 63 to be cut off.

The supply voltage V1 can be applied to the base voltage divider 77 of a fifth transistor stage 78 via the third output terminal E3 of the function switch 40. Said transistor stage 78 serves to drive the motor supply transistor 63 into full conduction, when necessary, in that the fifth transistor stage 78 is driven into conduction.

As already stated, the pocket dictation machine 1 has a socket 37. The socket 37 has five terminals H1 to H5. At the machine side these five terminals H1 to H5 are connected as follows. The terminal H1 is connected to the output terminal E2 of the function switch 40. The terminal H2 is connected to the line 68 which leads to the second motor terminal G2. The terminals H3 and H4 are interconnected by a resistor 80. This resistor 80 constitutes a resistance equivalent to the connection lead resistance in order to guarantee the same motor speed regardless of whether a plug has been inserted into the socket 37. The terminal H5 is connected to the terminal F1 of the speed control circuit 60 and thus to the measurement resistor 61 this terminal F1. At the socket side the following electrical connections with the terminals H1 to H5 have been made. A contact J1 is electrically connected to the terminal H1, a contact J2 to the terminal H2 and a contact J5 to the terminal H5. The contacts J1, J2 and J5 are situated in the socket 37. Likewise, the socket 37 accommodates two switches K2,3 and K4,5, the switch K2,3 being arranged between the two terminals H2 and H3 and the switch K4,5 being arranged between the two terminals H4 and H5. The plug 36, which is connected to the foot-switch unit 29 by the connection lead 35, can be inserted into the socket 37. When the plug 36 is inserted the two switches K2,3 and K4,5 in the socket 37 are switched to their open positions.

The plug 36, which is connected to the foot-switch unit 29 by three lines L1, L2 and L5 of the lead 35, comprises three contacts M1, M2 and M5 which are insulated from one another, which are electrically connected to the lines L1, L2 and L5 and which are in contact with the contacts J1, J2 and J5 of the socket 37 when the plug 36 is inserted. Of the three lines L1, L2 and L5 leading to the foot-switch unit 29 the line L1 is connected to an operating contact N1 of the second switch S2 which can be actuated by the actuating member 34 of the foot-switch unit 29 and which, as shown, is constructed as a change-over switch. The line L2 is connected to the base contact N2 of the second switch S2, whose rest contact N3 is connected to an operating contact N4 of the first switch S1 which can be actuated by the actuating member 32 of the foot-switch unit 29 and which is also constructed as a change-over switch. The line L5 is connected to the base contact N5 of the first switch S1, whose rest contact N6 is connected to a resistor 81. The resistor 81 forms part of a sixth transistor stage 82 which is accommodated in the foot-switch unit and whose transistor 83 can take over the switching function of the second switch S2. The sixth transistor stage 82 serves to achieve that after the "normal forward" function has been switched off off by means of the foot-switch unit 29 the pocket dictation machine 1 is briefly set to "fast reverse" via the transistor 83 for a time interval determined by the charging time of a capacitor 84 of the transistor stage 82. The transistor stage 82 comprises two further resistors 85 and 86, which are both connected to the line L1.

FIG. 4 shows the two change-over switches S1 and S2 in their rest positions, the base contact N2 of the second switch S2 being in contact with the rest contact N3 of this switch and the base contact N5 of the first switch S1 being in contact with the rest contact N6 of this switch. If the plug 36 has been inserted into the socket 37 the pocket dictation machine 1 is then set to the "stop" function by remote control by means of the foot-switch unit 29, as is shown for the two switches S1 and S2 in FIG. 4, because in this case each motor current circuit for the motor 21 is interrupted by the two switches S1 and S2. By changing over the first switch S1 in such a way that the base contact N5 is in contact with the operating contact N4 the pocket dictation machine 1 can be set to the "normal forward" function by remote control. By changing over the first switch S2 in such a way that the base contact N2 is in contact with the operating contact N1 the pocket dictation machine can be set to the "fast reverse" function by remote control.

In a first mode for recording dictations the appropriate functions of the pocket dictation machine 1 are switched on by hand by means of the two control members 23 and 25, in which case the foot-switch unit 29 does not cooperate with the pocket dictation machine 1 because the plug 36 of the foot-switch unit is not inserted in the socket 37.

When the slide switch 23 is in its stop-active position the function switch 40 assumes a stop position in which its switch contacts 41 and 42 are in contact with non-wired complementary contacts, so that the supply voltage V1 is not transferred. Therefore, the entire circuit arrangement of the pocket dictation machine 1 is not energized and, consequently, inoperative.

If in this case the slide switch 23 is set, for example, from its stop-active position to its forward-active position the function switch 40 is switched from its stop position to its forward position. As a result of this, the supply voltage V1 is applied to the circuit section 43 via the output terminal 43, so that this section becomes operative. Moreover, the supply voltage V1 is applied to the control circuit 59 via the output terminal E2. This results in closing of a motor current circuit from the output terminal E2 via the motor supply transistor 63, the motor 21, the terminal H2, the closed switch K2,3 and the terminal H3 of the socket 37, the equivalent resistor 80, the terminal H4, the switch K4,5 and the terminal H5 of the socket 37 as well as the measurement resistor 61. As a result of this, the motor 21 is started, its motor shaft being rotated anti-clockwise, which corresponds to the forward direction of rotation VW of the motor 21 in the present pocket dictation machine. The speed control circuit 60 then maintains the speed of the motor 21 at a constant value.

When the slide switch 23 is set to its fast forward position SVL and the function switch 40 is thus set to its SVL switch position the supply voltage V1 is also applied to the output terminal E2 and the above motor current circuit is closed likewise. However, for this function also the supply voltage V1 is applied to the output terminal E3, which causes the transistor 79 of the fifth transistor stage 78 to be turned on so that the motor-supply transistor 63 is driven into full conduction. Thus, for this function the speed of the motor 21 is not controlled but the motor rotates with an uncontrolled high speed determined by the supply voltage V1, the motor shaft of the motor rotating anti-clockwise, which again corresponds to the forward direction of rotation VW.

When the slide switch 23 is set to its reverse-active position and the function switch 40 is thus set to its fast reverse position SRL this has the same effect as the change-over of the function switch 40 to its fast-forward position SVL. During the "fast reverse" function the motor 21 is driven with a high speed and the motor shaft is also rotated anti-clockwise, which in the present machine corresponds to the forward direction of rotation VW of the motor although the "fast reverse" function has been selected. In the present pocket dictation machine the reversal of the direction of rotation for the "fast reverse" function in comparison with the "fast forward" function is effected in the mechanical part of the drive system, which will be described in more detail hereinafter in the description of this drive system.

In its second mode for the transcription of dictations the appropriate functions of the pocket dictation machine 1 are started by means of the foot-switch unit 29. For this purpose the plug 36 of the foot-switch unit 29 is inserted into the socket 37, causing the switches K2,3 and K4,5 in the socket 37 to be opened, as a result of which the functions of the pocket dictation machine 1 can be started only by means of the foot-switch unit 29 and no longer by means of the slide switch 23 and the function switch 40 which can be actuated by the slide switch 23, because each motor current circuit which can be closed by the function switch 40 is interrupted in that the two inhibit switches arranged in the socket 37 are opened. To prepare for the second mode in the present pocket dictation machine 1 the slide switch 23 should be set to its forward-active position after insertion of the plug 36 into the socket 37, causing the function switch 40 to be changed over to its forward switching position. In principle, this setting of the slide switch 23 to its forward-active position and the resulting consequences to prepare for remote-control operation are not strictly necessary but in the present machine this has been done because it yields the advantages of a reduced stroke and reduced forces in the mechanical part of the drive system.

If now, for example, the first switch S1 is set from its rest position to its operating position by foot actuation this results in a motor current circuit being closed, which circuit extends from the output terminal E2 of the function switch 40, to which terminal the supply voltage V1 is applied, to earth via the motor-supply transistor 63, the motor 21, the line 68, the terminal H2 and the contact J2 of the socket 37, the contact M2 of the plug 36, the line L2, the base contact N2 and the rest contact N3 of the second switch S2, which is in its rest position and which thus has a priority function relative to the first switch S1, the operating contact N4 and the base contact N5 of the first switch S1, the line L5, the contact M5 of the plug 36, the contact J5 and the terminal H5 of the socket 37, and the measurement resistor 61. As a result of this, the motor 21 is started and its motor shaft is rotated anti-clockwise, which corresponds to the forward direction of rotation VW of the motor 21. The speed-control circuit 60 then maintains the speed of the motor 21 at a constant value. In other words, when the first switch S1 of the foot-switch unit 29 is changed over the foot-switch unit 29 furnishes the earth potential V2 on the low end of the measurement resistor 61 as the forward control signal and applies it to the control circuit 59 via ultimately the terminal H2 of the socket 37. In the control circuit 59 the earth potential V2 is applied to the second motor terminal G2 via the line 68 connected to the terminal H2, so that in accordance with this forward control signal the pocket dictation machine 1 is set to the "normal forward" function by remote control in that its motor 21 is started in the forward direction of rotation VW.

In order to switch off the "normal forward" function by means of the foot-switch unit 29 the corresponding foot actuation of the foot-switch unit is discontinued, as a result of which the first switch S1 resumes its rest position. This causes the previously closed motor current circuit to be opened again. Moreover, it causes the measurement resistor 61 to be connected to the resistor 81 via the base contact N5 and the rest contact N6 of the switch S1. At the same time the two other resistors 85 and 86 of the transistor stage 82 are connected to the supply voltage V1 via the line L1, the contact M1 of the plug 36 and the contact J1 and the terminal H1 of the socket 37, which terminal is connected to the output terminal E2. This results in the capacitor 84, which is arranged in series between the resistors 85 and 81, being charged. During the charging process the transistor 83 is conductive. When the capacitor has been charged the transistor 83 is cut off. As long as the transistor 83 conducts, which is the case for some milliseconds, the pocket dictation machine is set to the "fast reverse" function via the transistor 83. The purpose of briefly switching to the "fast reverse" function will be explained below in the description of the mechanical part of the drive system of the pocket dictation machine 1. The function of the transistor 83 wholly corresponds to the function of the second switch S2, which will be described in detail hereinafter. It is to be noted that the resistor 86 serves as a discharging resistor for discharging the capacitor 84, enabling the capacitor 84 to be discharged for example after removal of the plug 36 from the socket 37.

When the second switch S2 is switched from its rest position to its operating position by foot actuation the supply voltage V1 is applied to the control circuit 59 as the reverse control signal, which circuit sets the pocket dictation machine 1 to the "fast reverse" function by remote control in accordance with this reverse control signal V1. The reverse control signal V1 is produced in that the supply voltage V1 on the output terminal E2 of the function switch 40 is applied to the operating contact N1 of the second switch S2 via the terminal H1 and the contact J1 of the socket 37, the contact M1 of the plug 36 and the line L1 and is applied to the control circuit 59 by the changed-over second switch S2 from the base contact N2 thereof via the line L2, the contact M2 of the plug 36, the contact J2 and the terminal H2 of the socket 37. In said control circuit 59 the reverse control signal formed by the supply voltage V1 is applied to the line 68 connected to the terminal H2 and from this line to the second motor terminal G2. The supply voltage V1 is also applied from the line 68 to the base voltage divider 67 of the second transistor stage 66, causing the transistor 65 to be turned on and the first motor terminal G1 to be connected to earth potential V2 by this transistor 65. Thus, the motor 21 has its first motor terminal G1 connected to earth potential V2 and its second terminal G2 to the supply voltage V1. As a result of this, the motor 21 operates with a high speed in uncontrolled manner, but its rotor shaft is rotated clockwise owing to the reversed polarity of the voltage supply to the motor 21, which corresponds to the reverse direction of rotation RW of the motor 21 in the present machine. The supply voltage V1, which in the present case is applied to the line 68, turns on the transistor 76 of the fourth transistor stage 75 via the base-voltage divider 74 of this stage, which divider is connected the line 68. As a result of this, the terminal F6 of the speed control circuit 60 is connected to the earth potential V2 via the transistor 76, so that the motor-supply transistor 63 is fully cut off and consequently does not influence the motor 21 which is now energized with a voltage of reversed polarity. In order to switch off the "fast reverse" function by means of the foot-switch unit the relevant actuation of the foot-switch unit is discontinued, so that the second switch S2 returns to its rest position and consequently the previously closed motor current circuit is opened again.

As long as the pocket dictation machine 1 operates in its second mode for the transcription of dictations, its functions being controlled by means of the foot-switch unit, care must be taken that the end stop function in accordance with the circuit section 43 remains inoperative when the machine has been set to "stop" by means of the foot-switch unit. Indeed, if this function is switched off again by the foot-switch unit after a function has been switched on by means of the foot-switch unit 29 this will result in the previously driven winding spindles not being driven any longer. Consequently, the light barrier 44 of the photo-electric end stop in accordance with the circuit section 43 no longer supplies any pulses. Since the function switch 40 is in its forward switching position and consequently the supply voltage V1 appears on the output terminal E1 this would cause the end-stop circuit section 43, which is energized from the output terminal E1, to respond and connect the terminal F6 of the speed control circuit 60 to earth potential V2 via the NAND gate 53 and the protective diode 64, thereby fully disconnecting this circuit, and also turn on the warning-signal generator 57 via the second NAND gate 55. The pocket dictation machine 1 would then be switched off completely, so that a subsequent switch actuation of the foot-switch unit 29 would not result in the relevant function being switched on. This must be avoided, which is achieved by means of the third transistor stage 71, whose transistor 73 is turned on via the resistor 72, which is connected to the output terminal E2 of the function switch 40, so that the output 52 of the first switching stage 48 is always held at earth potential V2, which simulates a rotating winding spindle 19 and prevents the end stop function in accordance with the circuit section 43 from being activated.

If the "normal forward" function has been switched on by means of the foot-switch unit 29 the measurement voltage V3 across the measurement resistor 61 appears on the line 68, which voltage is only slightly higher than the earth potential V2, so that the transistor 73 of the third transistor stage 71 is cut off and consequently does not influence the circuit section 43. In this case the end-stop function in accordance with the circuit section 43 is therefore operative, so that it is responsive when the end of tape is reached during the "normal forward" function started by means of the foot-switch unit, which is of course required.

If the "fast reverse" function has been switched on by means of the foot-switch unit, which function is always switched on briefly to go back, the end-stop function in accordance with the circuit section 43 is not needed. Therefore, if the "fast reverse" function has been started by means of the foot-switch unit, the supply voltage V1, which is then applied to the line 68, turns on the transistor 73 of the third transistor stage 71 via the resistor 69, in the same way as via the resistor 72 connected to the output terminal E2 of the function switch 40, so that the output 52 of the first transistor stage 48 is connected to earth potential V2 and the circuit section 43 is consequently disabled.

As already stated, the pocket dictation machine 1 has a drive system for the rotary drive of the two winding spindles 19 and 20, which system will be described in more detail with reference to FIGS. 5 to 9. This drive system, which bears the reference numeral 87, comprises the motor 21. As stated hereinbefore, the motor 21 can be started in a forward direction of rotation VW corresponding to the anti-clockwise direction, in which the shaft 88 of the motor 21 rotates when the machine is set to the "normal forward" function by the slide switch 23 in the first mode, when the machine is set to the "fast reverse" function by the slide switch 23 in the first mode, and when the machine is set to the "normal forward" function by the foot-switch unit 29 in the second mode. Moreover, the motor 21 can be started in a reverse direction of rotation RW corresponding to the clockwise direction, in which the shaft 88 of the motor 21 rotates when the machine is set to the "fast reverse" function by the foot-switch unit 29 in the second mode. The drive system 87 further comprises a drive mechanism 90 carried by a movable supporting device 89.

The drive mechanism 90 comprises a drive shaft 91 which is rotatably supported on the supporting device 89, to which shaft an intermediate wheel 92, which is rotatable by the motor and which acts as a flywheel mass, is coaxially connected and locked in rotation. The intermediate wheel 92 is constructed as a pulley. A further pulley 93 is rotationally locked to the shaft 88 of the motor 21 and the two pulleys 92 and 93 are coupled for the purpose of driving by means of a belt 94 wrapped around the two pulleys. The drive mechanism 90 further comprises an intermediate toothed wheel 95 which is connected coaxially and locked in rotation to the drive shaft 91. In the present machine the intermediate toothed wheel 95 is integral with the intermediate wheel 92. A reverse toothed wheel 96 connected coaxially to the reverse winding spindle 19 can be driven by the intermediate toothed wheel 95 when the reverse function has been started by means of the control member 23 in the first mode of operation of the machine 1. The drive mechanism 90 further comprises an intermediate friction wheel 97 which forms a part of the drive mechanism which can be actuated electromechanically and depending upon its direction of rotation or the direction of rotation of the drive motor 21. The intermediate friction wheel 97 is rotatably supported on a friction-wheel carrier 98 which is pivotable about the drive shaft 91 and is pressed against the drive shaft 91 for frictionally driving the drive shaft 91.

The friction wheel carrier 98 is formed by a lever which is pivotable about a pivot 99. The pivot 99 extends parallel to the drive shaft 91 and is formed by a substantially cylindrical projection of the lever 98. The projection 99 engages a partly cylindrical socket 100 provided in an intermediate carrier 101 for the friction-wheel carrier 98, which intermediate carrier is pivotable about the drive shaft 91. For the pivotal support of the intermediate carrier 101 on the drive shaft 91 the intermediate carrier 101 has a bore 102 by means of which the intermediate carrier 101 is pivotably mounted on the drive shaft 91. A spring 103 in the form of a tension spring attached to the intermediate carrier 101 and the friction-wheel carrier 98 acts on the two carriers 98 and 101 at their ends which are remote from the pivot 99 to tension these two carriers 98 and 101 relative to one another. The tension spring 103 determines the pressure with which the friction wheel 97, which is pivotably supported on the friction-wheel carrier 98, is pressed against the drive shaft 91. At the location of the tension spring 103 the friction-wheel carrier 98 has a projection 104 which extends in the direction of the tension spring 103 and which engages a corresponding recess 105 in the intermediate carrier 101 in order to guide the two carriers 98 and 101 relative to one another.

Figure 9:
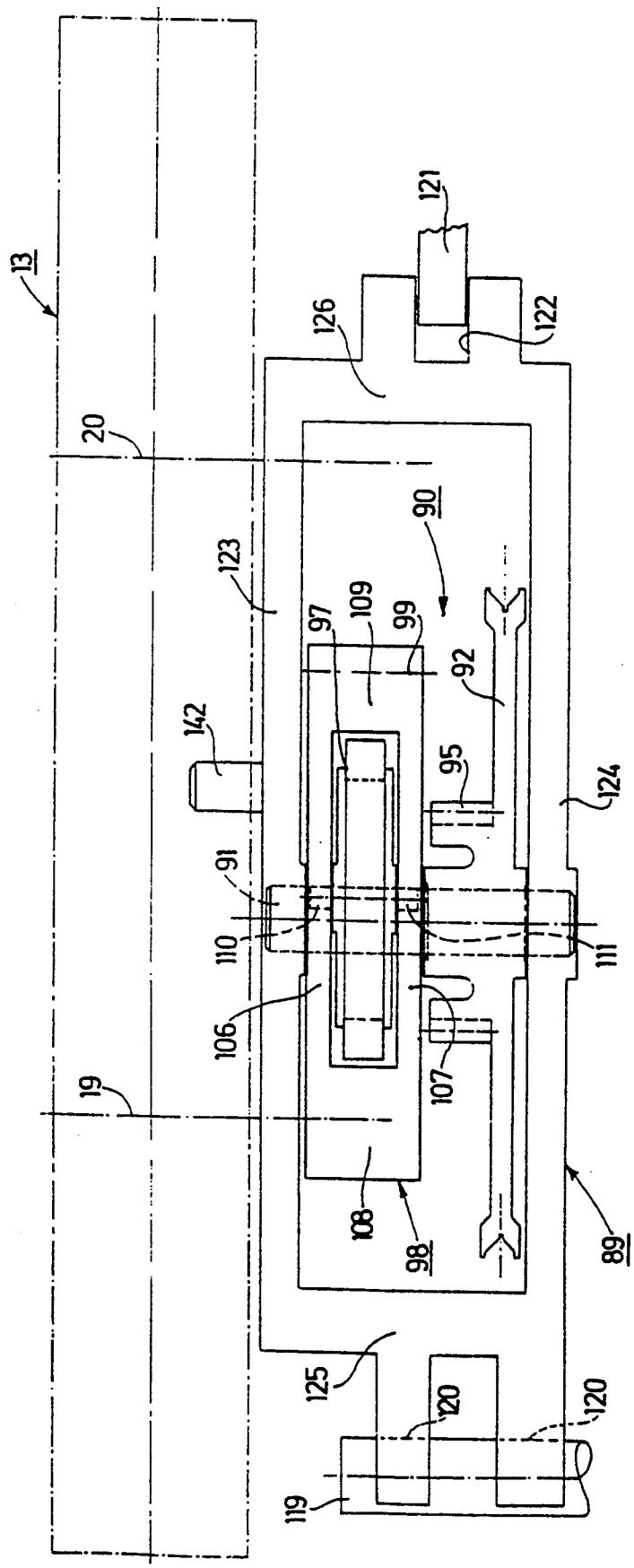
FIG. 9 shows the drive system of FIGS. 5 to 8 in a diagrammatic side view to an enlarged scale in comparison with FIGS. 5 to 8.

As is apparent from FIG. 9, the lever forming the friction-wheel carrier 98 has the shape of a frame and comprises two lever portions 106 and 107 extending transversely of the drive shaft 91 and two lever portions 108 and 109 extending parallel to the drive shaft 91. The intermediate friction wheel 97 is arranged between these four lever portions 106 to 109, each of the two lever portions 106 and 107 which extend transversely of the drive shaft 91 rotatably supporting a shaft end 110 and 111 connected to the intermediate friction wheel 97 for the double support of the intermediate friction wheel 97. Each of the two lever portions 106 and 107 is provided with a socket 112 in which the shaft ends 110 and 111 engage.

A stop pin 113 projects from the intermediate carrier 102 in upward direction towards the drive shaft 91 to cooperate with a stationary abutment 114 of the machine, which abutment is shown only symbolically. A stop pin 115 also projects from the intermediate carrier 98 in upward direction towards the drive shaft 91 to cooperate with a stationary abutment 116 of the machine, which abutment is shown only symbolically. The two abutments 114 and 116 are situated on an intermediate support, which is not shown in FIGS. 5 to 8 for the clarity of these drawings and which partly covers the drive mechanism 90.

The intermediate friction wheel 97 can drive a forward friction wheel 117, which is coaxially connected to the forward winding spindle 20, both in the first mode with the forward function switched on by means of the control member 23 and in the second mode with the forward function switched on by means of the foot-switch unit 29. Moreover, the intermediate friction wheel 97 can also drive a reverse friction wheel 118, which is coaxially connected to the reverse winding spindle 19, in the second mode with the reverse function switched on by means of the foot-switch unit 29. In the first mode if the reverse function has been switched on by means of the control member 23, when the intermediate toothed wheel 95 drives the reverse toothed wheel 96 and the intermediate friction wheel 97 by virtue of the driving conditions tends to come into driving engagement with the forward friction wheel 117, involving two conflicting drive methods for the winding spindles 19 and 20 and the magnetic tape 12, the intermediate friction wheel 97 is held disengaged from the forward friction wheel 117 by separate blocking means to preclude a cooperation of the intermediate friction wheel 97 with the forward friction wheel 117. These separate blocking means will be described in more detail hereinafter.

The supporting device 89 for the drive mechanism 90 is formed by a lever which is pivotable about a pivot 119 which extends parallel to the drive shaft 91. The pivot 119 is constituted by a stationary cylindrical pin of the machine, the lever 89 being mounted on said pin by means of two sockets 120. At the end which is remote from the pivot 119 the lever 89 is guided in the height direction by means of a stationary strip of the machine, which strip 121 engages a groove 122 in the lever 89. The strip 121 is not shown in FIGS. 5 to 8. As is apparent from FIG. 9, the lever has the shape of a frame and comprises two lever portions 123 and 124 extending transversely of the drive shaft 91 and two lever portions 125 and 126 extending parallel to the drive shaft 91. The drive shaft 91 is rotatably supported in the two lever portions 123 and 124 which extend transversely of the drive shaft 91 to provide a double support for this shaft. For this purpose the drive shaft 91 engages a socket 127 in each of these lever portions 123 and 124.

Figure 5:
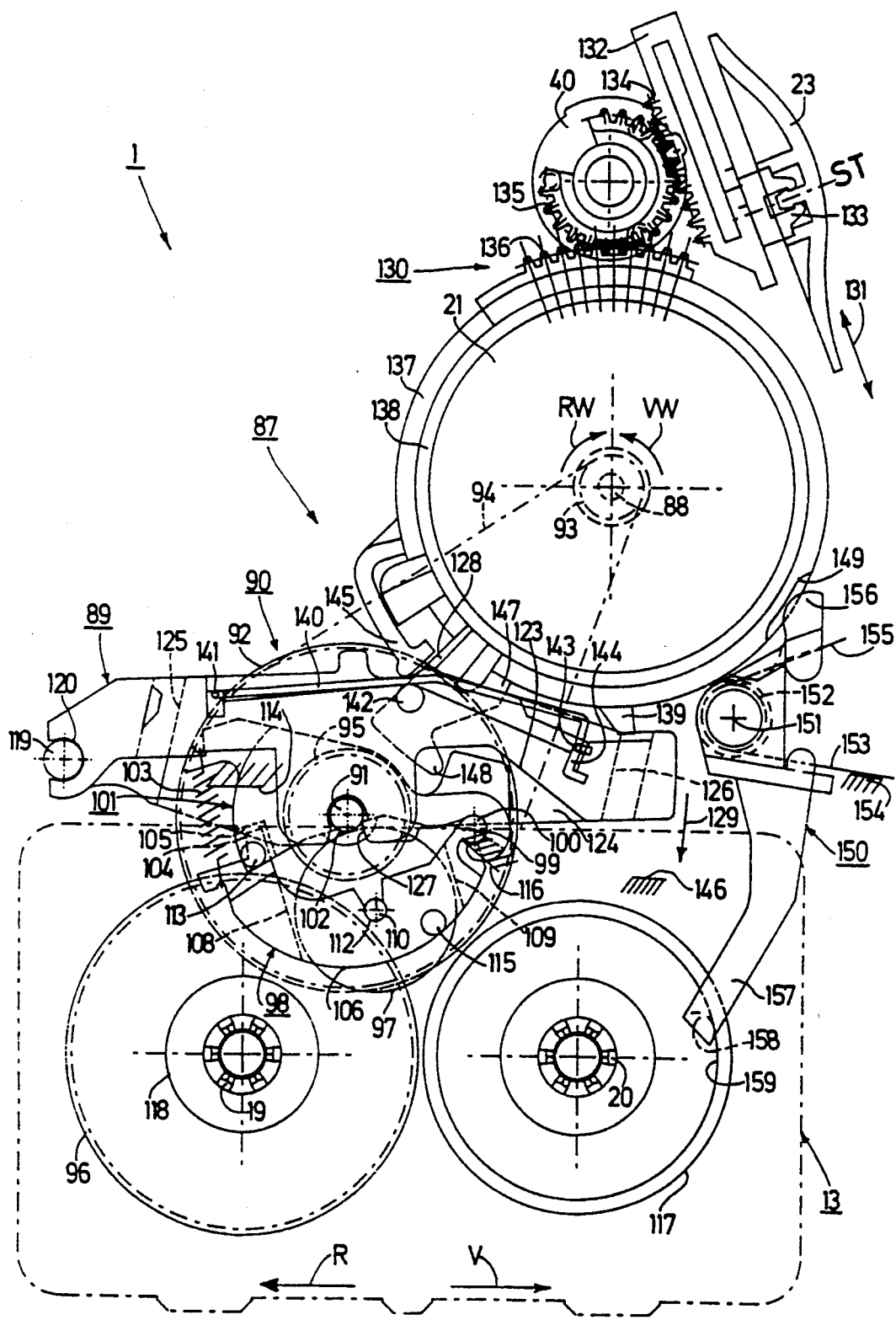
FIG. 5 is a scaled-up plan view of a drive system of the pocket dictation machine shown in FIGS. 1 and 2, a control member of the pocket dictation machine in the form of a sliding button being in its stop-active position and a supporting device for a drive mechanism which forms part of the drive system being in its rest position.
Figure 6:
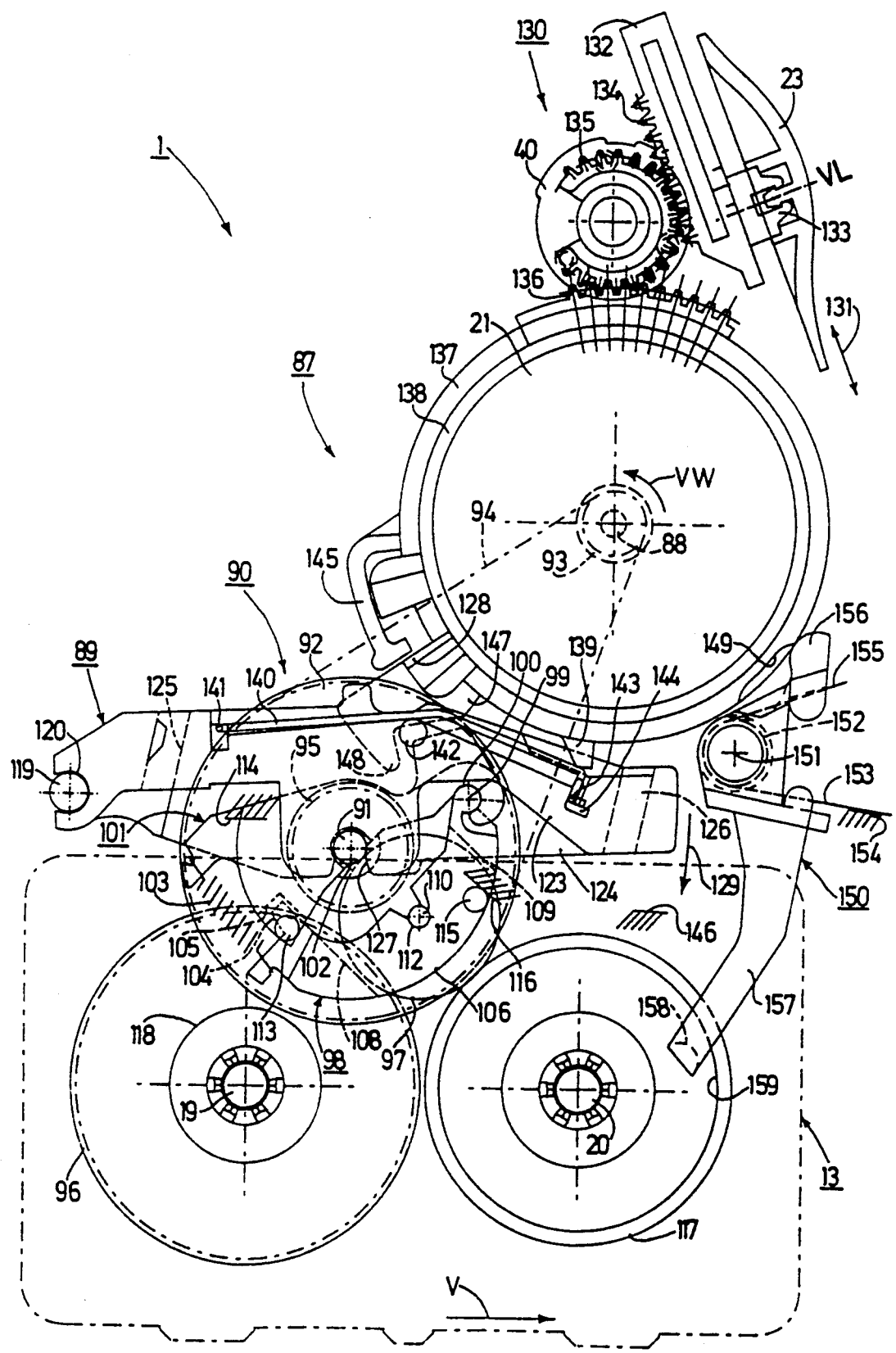
FIG. 6 shows the drive system in the same way as FIG. 5, the control member being in its forward-active position and the supporting device for the drive mechanism being in a forward operating position and an intermediate friction wheel of the drive mechanism being in driving engagement with a forward friction wheel.
Figure 7:
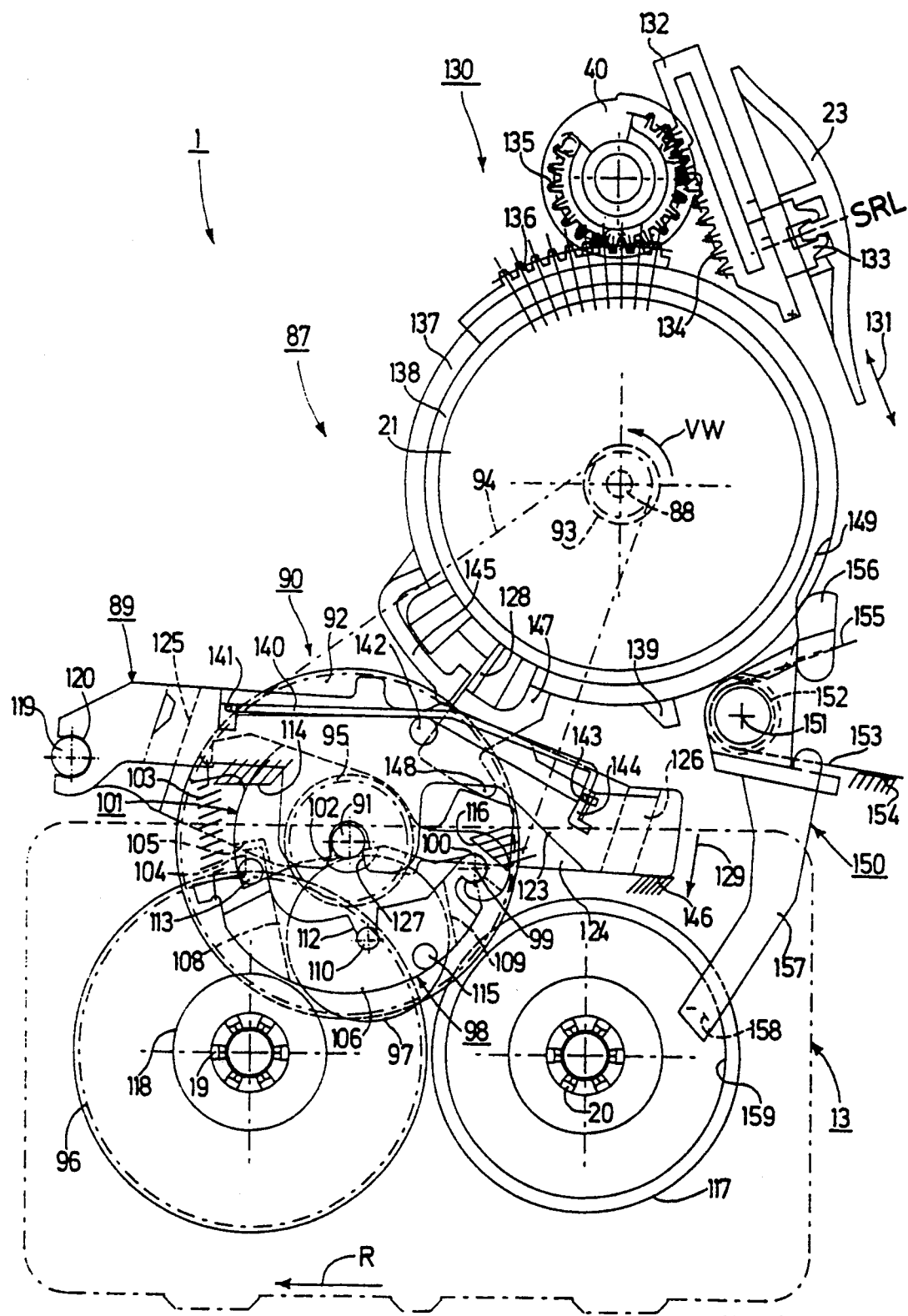
FIG. 7 shows the drive system in the same way as FIG. 5, the control member being in its reverse-active position and the supporting device for the drive mechanism being in a reverse operating position and an intermediate toothed wheel of the drive mechanism being in mesh with a reverse toothed wheel.
Figure 8:
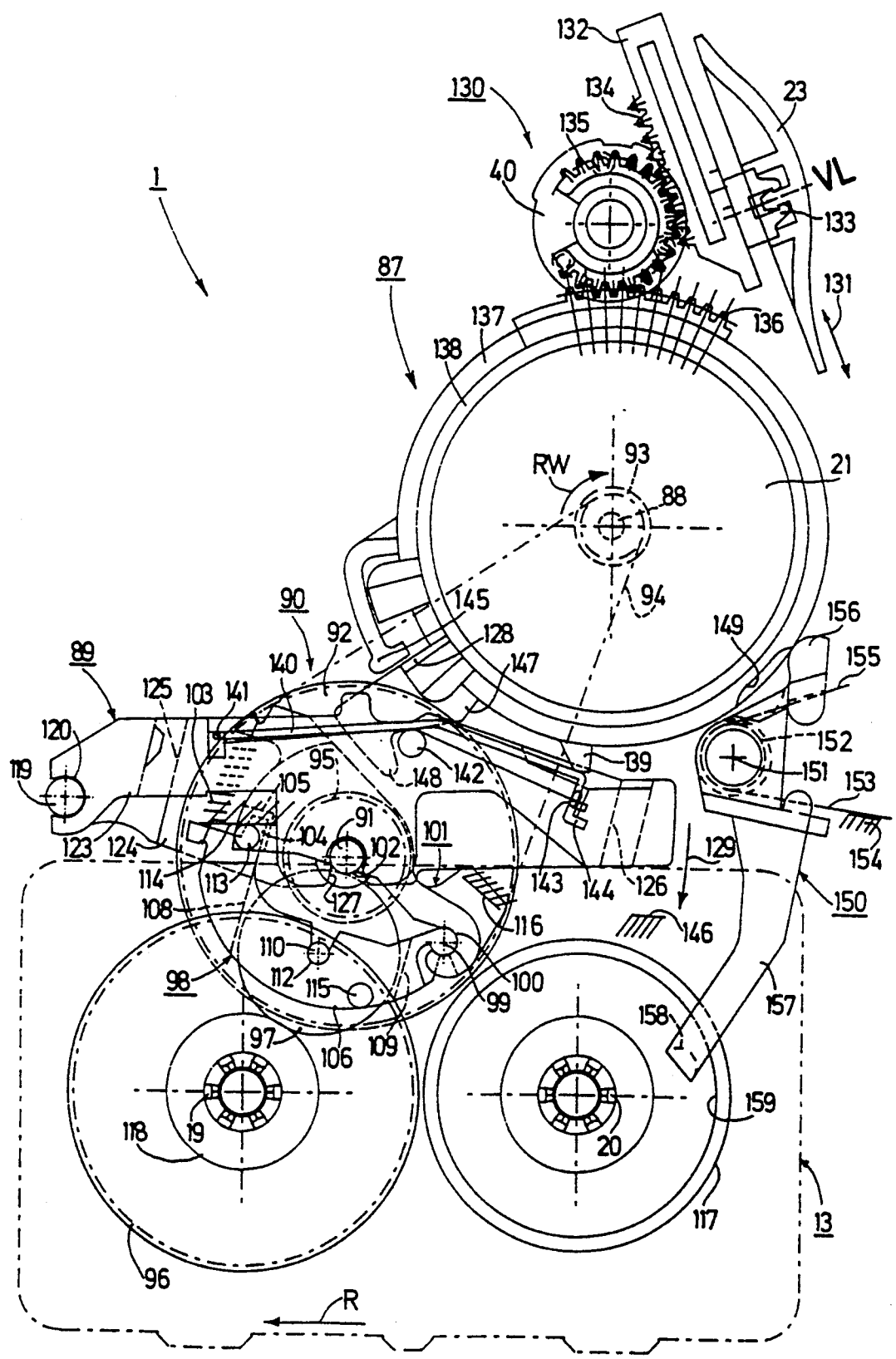
FIG. 8 shows the drive system in the same way as FIG. 5, the control member being in its forward-active position and the supporting device for the drive mechanism being in a further reverse operating position and the intermediate friction wheel of the drive mechanism being in driving engagement with a reverse friction wheel.

The supporting device for the drive mechanism, which device is formed by the lever 89, can be set to a rest position. For this purpose, as can be seen in FIG. 5, a positioning stop constructed as a narrow strip 128 is arranged adjacent the supporting device 89 in its rest position, against which stop the supporting device 89 is held in its rest position under the influence of the tractive force of the belt 94 wrapped around the pulley 93 at the motor side and the pulley 92 serving as an intermediate wheel. The supporting device 89 can be set from its rest position shown in FIG. 5, which the supporting device 89 occupies when the pocket dictation machine 1 is set to "stop" by means of the control member 23, to its operating positions in only one actuating direction. In the Figures the actuating direction is indicated by an arrow 129. The operating positions of the supporting device 89 are shown in FIGS. 6, 7 and 8 and will be described in more detail hereinafter. However, here it is to be noted that the supporting device 89 is movable out of its rest position shown in FIG. 5, firstly to a forward operating position, which is shown in FIG. 6 and which the supporting device 89 occupies both in the first mode when the forward function is switched on by means of the control member 23 and in the second mode when the forward function is switched on by means of the foot-switch unit 29, secondly to a reverse operating position, which is shown in FIG. 7 and which the supporting device 89 occupies in the first mode when the reverse function is switched on by means of the control member 23, and thirdly to a further reverse operating position, which is shown in FIG. 8 and which the supporting device 89 occupies in the second mode when the reverse function is switched on by means of the foot-switch unit 29.

To set the supporting device 89 from its rest position to its operating positions the pocket dictation machine 1 comprises an actuating device 130, which cooperates both with the control member 23 and with the supporting device 89 for the drive mechanism 90. The actuating device 130 comprises a slide 132 which is guided so as to be slidable in the directions indicated by the double arrow 131 and which has a projection 132 to which the slide switch 23 forming the control member 23 is connected. The slide 132 is provided with a toothed rack 134 meshing with an incomplete toothed wheel 135. The function switch 40 is coaxial with the toothed wheel 135 and its switch contacts 41 and 42 are movable between the four switch positions of the function switch 40 by means of the toothed wheel 135. Teeth 136 connected to a rotatable actuating ring 137 are in mesh with the toothed wheel 135. For its rotatable support the actuating ring 137 is mounted on a sleeve 138 which accommodates the motor 21 to secure it in the pocket dictation machine 1.

The actuating ring 137 carries the above-mentioned strip 128, which projects radially from the actuating ring 137 and forms the positioning stop for positioning the supporting device 89 in its rest position. In its rest position, as illustrated in FIG. 5, the supporting device 89 bears against the strip 128 under the influence of the tractive force of the belt 94. Instead of a positioning stop in the form of the strip 128 which is movable along with the actuating ring 137 a stationary positioning stop may be provided on the machine, the lever 89 forming the supporting device bearing against this stationary stop in its rest position.

The actuating ring 137 further comprises a first actuating projection 139, which projects radially from the actuating ring 137. The first actuating projection 139 is adapted to cooperate with an actuating spring 140. The actuating spring 140 is constructed as a bent rod spring. With its end portion 141, which faces the pivot 119 of the supporting device 89 and which is angled towards the pivot 119, the rod spring 140 is fixedly attached to the supporting device 89. With its central portion the rod spring 140 bears against a pin 142 which projects from the supporting device 89. The other end portion 143 is also angled towards the pivot 119, the angled free end portion projecting into a slot 144 and bearing against the end of the slot 144 which faces the actuating ring when the first actuating projection 139 does not cooperate with the rod spring 140. When the first actuating projection 139 is suitably moved in the clockwise direction out of the initial position shown in FIG. 5 this projection will cooperate with the rod spring 140 at the location of the end 143 of this spring, causing the rod spring 140 to be moved in the direction indicated by the arrow 129 and thus causing the supporting device 89 and the drive mechanism supported thereby to be moved in the direction indicated by the arrow 129 via the rod spring 140 and the pin 142.

In addition, the actuating ring 137 has a second actuating projection 145, which projects radially from the actuating ring 137 and is L-shaped and inherently resilient. The second actuating projection 145 is adapted to cooperate directly with the supporting device 89. When the second actuating projection 145 is suitably moved in the anti-clockwise direction out of the initial position shown in FIG. 5 this projection 145 will press the supporting device 89 in the direction indicated by the arrow 129 until the supporting device abuts against a limiting stop 146, shown only symbolically, the second actuating projection 145 being deflected resiliently. The limiting stop 146 is also arranged on the intermediate carrier which has been mentioned above but is not shown.

The actuating ring 137 also comprises a third actuating projection 147, which also projects radially from the actuating ring 137. This actuating projection 147 has a nose-shaped free end 148. The third actuating 147 forms the above-mentioned blocking means for keeping the intermediate friction wheel 97 disengaged from the forward friction wheel 117 when the reverse function has been switched on by the control member 23 in the first mode. The third actuating projection 147 is adapted to cooperate with the intermediate carrier 101 for the friction wheel carrier 98. In the case of a suitable displacement of the third actuating projection 147 out of the initial position shown in FIG. 5 in the anti-clockwise direction the nose-shaped free end 148 of the third actuating projection 147 will move the intermediate carrier 101, causing the intermediate carrier 101 to be pivoted so far clockwise about the drive shaft 91 into a position shown in FIG. 7 that when it is driven clockwise in the first mode the intermediate friction wheel 97, which is rotatably supported on the friction wheel carrier 98, is not engageable with the friction wheel 117 which is connected to the forward winding spindle 20.

The actuating ring 137 further has a control recess 149 by means of which a brake lever 150 can be controlled. The brake lever 150 is pivotable about a pivot 151. One limb 153 of a helical spring 152 bears against a stationary stop 154 of the machine and another limb 155 loads the brake lever 150 so as to urge a free end 156 of the brake lever 150, which free end is adapted to cooperate with the actuating ring 137 at the location of the control recess 149, towards the actuating ring 137. In the initial position of the actuating ring 137 as shown in FIG. 5 the free end 156 of the brake lever 150 is situated in the control recess 149 without the recess bottom being touched, thereby causing a brake shoe 158 arranged on the other end 157 of the brake lever 150 to press against a braking surface 159 of the forward friction wheel 117, which is connected to the forward winding spindle 20. The braking force is then determined inter alia by the spring force of the helical spring 152. Upon each movement of the actuating ring 137 out of the initial position shown in FIG. 5 the brake lever 150 is pivoted by the actuating ring 137 so as to lift the brake shoe 158 off the braking surface 159 of the forward friction wheel 117.

FIG. 5 illustrates the operating position in which the pocket dictation machine 1 has been set to "stop", the control member 23 being in its stop-active position. The supporting device 89 is then in its rest position and all the parts of the drive system 87 are inoperative.

When the pocket dictation machine 1 is in the first mode for dictation recording the "normal forward" function can be started by moving the control member 23 from its stop-active position into its forward-active position, illustrated in FIG. 6. By means of the slide 132 and the toothed wheel 135 the function switch 40 is then actuated and the actuating ring 137 is rotated clockwise. As a result of this, the brake lever 150 is pivoted by the actuating ring 137 to lift the brake shoe 158 and by means of the actuating projection 139 and via the rod spring 140 the supporting device 89 with the drive mechanism 90 is moved purely mechanically to a forward operating position in the direction indicated by the arrow 129, but it is first moved beyond this forward operating position into an overtravel position, which for the sake of simplicity is not indicated in FIG. 6. As a result of said actuation of the function switch 40 the motor 21, as described with reference to FIG. 4, is started in its anti-clockwise forward direction of rotation VW, causing the intermediate friction wheel 92 to be driven clockwise via the belt 94, the intermediate wheel 92 and the drive shaft 91. This causes the intermediate friction wheel 97 to be pivoted automatically anti-clockwise relative to the drive shaft 91, the intermediate friction wheel 97 being in driving engagement with the forward friction wheel 117. The rotating motor 21 now moves the intermediate friction wheel 97 electromechanically. This proceeds until the stop pin 115 on the friction-wheel carrier 98 abuts against the stationary abutment 116. Owing to the consequent rotation of the intermediate friction wheel 97 on the forward friction wheel 115 via the friction-wheel carrier 98 and the intermediate carrier 101 this movement of the intermediate friction wheel 97 results in the supporting device 89 being moved out of the briefly occupied overtravel position into the forward operating position shown in FIG. 6 in a direction opposite to the actuating direction 129. As the rod spring 140 then remains invariably supported by the first actuating projection 139 of the actuating ring 137 this rod spring 140 remains tensioned while its end 143 is clear in the slot 144, thereby providing the pressure with which the intermediate friction wheel 97 is pressed against the forward friction wheel 117. Thus, by means of the intermediate friction wheel 97 driven by the motor 21 the forward friction wheel 117 is driven and drives the forward winding spindle 20 and hence the magnetic tape 12 in the forward transport direction V in accordance with the selected "normal forward" function. In order to stop the "normal forward" function the slide switch 23 merely has to be reset to its stop-active position.

In the first mode of the pocket dictation machine 1 for recording dictations it is also possible to start the "fast forward" function, which is effected by moving the control member 23 from the forward-active position shown in FIG. 6 to its fast-forward position SVL. From a mechanical point of view substantially this starts substantially the same process as upon starting of the "normal forward" function, but in this case the first actuating projection 139 is pivoted slightly further clockwise. However, independently of this it cooperates with the rod spring 140 in substantially the same way. During the "fast forward" function the forward winding spindle 20 is also driven via the intermediate friction wheel 97 and the forward friction wheel 117 but the winding spindle 20 rotates more rapidly because the motor 21 rotates more rapidly, as has been described with reference to FIG. 4.

When the pocket dictation machine 1 is in the first mode for dictation recording it is also possible to start the "fast reverse" function. For this purpose the control member 23 must be set to its reverse-active position, which is illustrated in FIG. 7. By setting the control member 23 to its reverse-active position the function switch 40 is actuated via the slide 132 and the toothed wheel 135 and the actuating ring 137 is rotated anti-clockwise. As a result of this, the brake lever 150 is pivoted by the actuating ring 137 in order to lift the brake shoe 158. Moreover, the supporting device 89 with the drive mechanism 90 is pivoted purely mechanically in the actuating direction 129 towards a reverse operating position by means of the second actuating projection 145 and in this operational case the supporting device 89 is directly mover into the reverse operating position shown in FIG. 7, in which the supporting device 89 bears against the limiting stop 146, the second actuating projection 145, which acts upon the supporting device 89, being resiliently deflected to a small extent. In this reverse operating position of the supporting device 89 the intermediate toothed wheel 95 is in mesh with the reverse toothed wheel 96 connected to the reverse winding spindle 19. When the actuating ring 137 is rotated the free nose-shaped end 148 of the third actuating projection 147 of this ring engages with the intermediate carrier 101, causing the intermediate carrier 101 with the friction-wheel carrier 98 to be pivoted clockwise about the drive shaft 91, so that subsequently the intermediate friction wheel 97 cannot operatively engage with the forward friction wheel 117 in an electromechanical way when the motor 21 is driven in its forward direction of rotation VW. As a result of said actuation of the function switch 40 the motor 21, as already described with reference to FIG. 4, is now also started in the anti-clockwise forward direction of rotation VW, so that the intermediate toothed wheel 95, which is integral with the intermediate wheel 92, is driven anti-clockwise via the belt 94 and the intermediate wheel 92. The intermediate toothed wheel 95, which is in mesh with the reverse toothed wheel 96 in this reverse operating position of the supporting device 89, then drives the reverse toothed wheel 96 and the latter drives the reverse winding spindle 19 in the clockwise direction. Consequently, the magnetic tape 12 is driven in the reverse transport direction R in conformity with the selected "fast reverse" function. In order to stop the "fast reverse" function the slide switch 23 merely has to be set to its stop-active position.

In order to enable the second mode of the pocket dictation machine 1 to be carried out in order to transcribe dictations a foot-switch unit 29 must be connected to the pocket dictation machine 1, as already stated, and after this the control member 23 must be set to its forward-active position, as is illustrated in FIG. 8. The activation of the two inhibit switches when the foot-switch unit 29 is plugged in prevents the forward function of the pocket dictation machine 1 from being started when the control member 23 is subsequently set to its forward-active position. By means of the pocket dictation machine 1 thus prepared a transcription mode is now possible, in which also a forward function and a reverse function can be started, though now by remote control from the foot-switch unit 29.

When the control member 23 is thus set to its forward-active position the supporting device 89 is moved purely mechanically, by means of the actuating device 130 which can be actuated by the control member 23, to the forward operating position already described and also to a further reverse operating position in the second mode, which further reverse operating position differs from the reverse operating position in the first mode, but is first pivoted in the direction indicated by the arrow 129 beyond this forward operating position and this further reverse operating position into the above-mentioned overtravel position, in which the supporting device 89 carrying the drive mechanism 90 remains as long as the motor 21 is not switched on by the foot-switch unit 29.

If the forward control signal is produced in order to start the forward function by remote control by means of the foot-switch unit 29 while the supporting device 89 is in the above-mentioned overtravel position, the result of this is, as already described with reference to FIG. 4, that the motor 21 is started in its forward direction of rotation VW corresponding to the anti-clockwise direction, thereby causing the intermediate friction wheel 97 to be driven clockwise via the belt 94, the intermediate wheel 92 and the drive shaft 91 by the pulley 93. In this case the intermediate friction wheel 97 is also pivoted anti-clockwise electromechanically relative to the drive shaft 91, so that the intermediate friction wheel 97 engages with the forward friction wheel 117 and the supporting device 89 is thus moved from its overtravel position into its forward operating position. Thus, when the forward function is started by means of the remote-control device 29 the driving situation is the same as obtained when the forward function is started by means of the control member 23 and as shown in FIG. 6. Thus, in exactly the same way, the magnetic tape 12 is driven for transport in the forward direction V when the forward function is started by means of the foot-switch unit 29.

In order to stop the forward function which has been started by means of the foot-switch unit the relevant foot-switch actuation merely has to be discontinued. When the forward function started by means of the foot-switch unit is stopped, the motor 21 is driven briefly in its reverse direction of rotation RW, as already described with reference to FIG. 4. It is thus achieved that the intermediate friction wheel 97 is briefly rotated anti-clockwise so that the intermediate friction wheel 97 is electromechanically disengaged from the forward friction wheel 117, which prevents that the intermediate friction wheel 97 remains pressed against the forward friction wheel 117 in the case of prolonged idleness of the pocket dictation machine 1 after the forward function has been started by means of the foot-switch unit 29, which would lead to permanent deformations in the rubber friction material of the intermediate friction wheel 97.

If the reverse control signal is produced in order to start the reverse function by remote control by means of the foot-switch unit 29 while the supporting device 89 is in the above-mentioned overtravel position, the result of this is, as already described with reference to FIG. 4, that the motor 21 is started in its reverse direction of rotation RW corresponding to the clockwise direction. This causes the intermediate friction wheel 97 to be driven anti-clockwise via the belt 94, the intermediate wheel 92 and the drive shaft 91 by the pulley 93, which is connected to the motor shaft 88. The intermediate friction wheel 97 is then pivoted clockwise electromechanically relative to the drive shaft 91, so that the intermediate friction wheel 97 engages with the reverse friction wheel 118. In this case the rotating motor 21 also causes the intermediate friction wheel 97 to be moved electromechanically. This proceeds until the stop pin 113 on the intermediate carrier 101 abuts against the stationary abutment 114 of the machine. Owing to the consequent rotation of the intermediate friction wheel 97 on the reverse friction wheel 118 via the friction-wheel carrier 98 and the intermediate carrier 101 this movement of the intermediate friction wheel 97 results in the supporting device 89 being moved out of the above-mentioned overtravel position into the reverse operating position shown in FIG. 8 in a direction opposite to the direction indicated by the arrow 129. In this case the rod spring 140, which remains invariably supported by the first actuating projection 139 of the actuating ring 137, remains also tensioned during said movement of the supporting device 89 from the overtravel position into its further reverse operating position in a direction opposite to the actuating direction 129. In this way the pressure is produced by means of which the intermediate friction wheel 97 is pressed against the reverse friction wheel 118. The reverse friction wheel 118 is driven clockwise via the intermediate friction wheel 97, which is driven by the motor 21, so that the reverse winding spindle 19 is rotated accordingly and hence the magnetic tape 12 is driven in the reverse transport direction R in accordance with the "fast reverse" function started by remote control. In order to stop the "fast reverse" function the relevant foot-switch actuation merely has to be discontinued.

We claim:

1. A hand-held dictation machine which is constructed to store and reproduce speech signals which comprises a housing and a holder compartment which is enclosed by the housing and is adapted to receive a storage medium for storing the speech signals and is constructed to carry out a forward function and a reverse function, in which forward function the speech signals can be stored in the storage medium starting from a storage starting position, or speech signals previously stored in the storage medium can be read from the storage medium and in which reverse function it is possible to return to the storage starting position after storage or read-out, which machine comprises at least one control member which can be switched by hand between at least two active positions, including one forward-active position and one reverse-active position, in which machine in its dictation-recording mode the forward function can be started by setting the relevant control member by hand to its forward-active position and the reverse function can be started by setting the relevant control member by hand to its reverse-active position, characterised in that in addition to the dictation-recording mode, the pocket dictation machine had dictation machine is also operable in a second mode for the transcription of dictations, in which the functions of the dictation machine can be started by means of a control device instead of by means of said at least one control member, which control device can be controlled at a location remote from the dictation machine and by means of which at least a forward control signal and a reverse control signal can be produced, the control device is formed by a foot-switch unit comprising a connection lead terminated with a plug, the connection lead and the plug being adapted to transfer the forward control signal and the reverse control signal, and the dictation machine comprises a socket for receiving the plug terminating the connection lead of the foot-switch unit, which socket is also adapted to transfer the forward control signal and the reverse control signal, and the holder compartment is adapted to receive a storage cassette in the form of a magnetic tape which extends between two juxtaposed rotatable reel hubs, of which one hub forms a forward reel hub and the other a reverse reel hub, and which comprises two winding spindles which project into the holder compartment for the rotary drive of the two reel hubs, of which one spindle is a forward winding spindle and the other is a reverse winding spindle and which are both rotationally locked to at least one coaxial drive wheel each, a motor and a drive mechanism being carried by a supporting device which is at least movable between at least a forward operating position and at least a reverse operating position, which drive mechanism comprises an intermediate wheel, which is rotatable by the motor, and by which, when the supporting device has been set to a forward operating position via the drive wheel which is coaxially connected to the forward winding spindle, the forward winding spindle can be driven to move the magnetic tape in a forward transport direction and, when the supporting device has been set to a reverse operating position via the drive wheel which is coaxially connected to the reverse winding spindle, the reverse winding spindle can be driven to move the magnetic tape in a reverse transport direction, and which comprises an actuating device which cooperates with the at least one control member and with the supporting device for the drive mechanism, by means of which actuating device in the first mode the supporting device for the drive mechanism can be set purely mechanically to at least a forward operating position by setting the relevant control member by hand to its forward-active position, and by means of which in the first mode the supporting device for the drive mechanism can be set purely mechanically to at least a reverse operating position by setting the relevant control member by hand to its reverse-active position, and wherein the drive mechanism, which is supported by the supporting device, which in the first mode is movable purely mechanically by the actuating device by hand actuation of the relevant control member, is adapted to be electromechanically movable in at least a part of the drive mechanism by remote control in dependence upon the two control signals produced in the second mode by the control device and applied to the control circuit, and in the second mode the drive mechanism drives the forward winding spindle when said drive mechanism has been moved electromechanically in dependence upon the forward control signal, and the drive mechanism drives the reverse winding spindle when said drive mechanism has been moved electromechanically in dependence upon the reverse control signal.

2. A dictation machine as claimed in claim 1, whose drive system comprises a motor which has a reversible direction of rotation and which can be started in a forward direction of rotation and in a reverse direction of rotation opposite to the forward direction of rotation (VW), characterised in that in the second mode the motor can be started by remote control in its forward direction of rotation and in its reverse direction of rotation (RW) in dependence upon the two control signal produced by means of the control device (29) and applied to the control circuit, and the drive mechanism, which is supported by the supporting device which in the first mode is movable purely mechanically by hand actuation of the relevant control member via the actuating device and which comprises at least one intermediate wheel drivable by the motor, at least in a part of the drive mechanism, is adapted to be electromechanically movable in dependence upon the direction of rotation of the motor (21) started by remote control in the second mode and the direction of rotation of the intermediate wheel which is drivable by the motor.

3. A dictation machine as claimed in claim 1, characterised in that when in the first mode the supporting device has been set purely mechanically to a forward operating position via the actuating device by hand actuation of the relevant control member the drive mechanism, which is carried by the supporting device, is in addition electromechanically movable, at least in a part of the drive mechanism, in the first mode in dependence upon the forward direction of rotation of the motor started by the control member which has been set to its forward-active position, the drive mechanism after such an electromechanical actuation thereof in the first mode driving the forward winding spindle via the drive wheel, which is coaxially connected to the forward winding spindle.

4. A dictation machine as claimed in claim 3, characterised in that in the second mode, in addition to the first mode, the supporting device is movable purely mechanically at least to a forward operating position via the actuating device in that the relevant control member has been set to its forward-active position by hand, and there is provided at least one inhibit switch which can be changed over by hand, whose change-over prevents the forward function to be started in the second mode when the relevant control member has been set to its forward-active position by hand.

5. A dictation machine as claimed in claim 4, characterised in that the supporting device for the drive mechanism is constructed to be set to a rest position and from the rest position to its operating positions in only one actuating direction.

6. A pocket dictation machine as claimed in claim 5, characterised in that the drive mechanism, which is carried by the supporting device, which is movable purely mechanically from a rest position into both its operating positions in only one actuating direction and which is movable purely mechanically to at least a forward operating position in both modes, and is movable electromechanically in both modes, at least in a part of the drive mechanism, in dependence upon the instantaneous direction of rotation of the motor, comprises a drive shaft, which is rotatably supported on the movable supporting device and to which the intermediate wheel, which is rotatable by the motor is coaxially connected and rotationally locked, and an intermediate toothed wheel, which is coaxially connected and rotationally locked to the drive shaft and which can drive a reverse toothed wheel provided as the drive wheel which is coaxially connected to the reverse winding spindle, when the supporting device for the drive mechanism has been moved to a reverse operating position via the actuating device in that the relevant control member has been set by hand to its reverse-active position, and the motor, which has been started in its forward direction of rotation by the control member which has been set to its reverse-active position, and an intermediate friction wheel which forms an electromechanically movable part of the drive mechanism and which is movable in dependence upon its direction of rotation, which intermediate friction wheel is rotatably supported on a friction-wheel carrier, which is pivotable about the drive shaft, and is kept pressed against the drive shaft and is drivable thereby in frictional engagement, by means of which friction wheel a forward friction wheel, provided as the drive wheel which is coaxially connected to the forward winding spindle, can be driven in the first mode when the supporting device for the drive mechanism has been moved to a forward operating position via the actuating device in that the relevant control member has been set to its forward-active position and the motor has been started in its forward direction of rotation by the control member which has been set to its forward-active position, and in the second mode when the supporting device has been moved towards a forward operating position via the actuating device in that the relevant control member has been set to its forward-active position, and the motor has been started in its forward direction of rotation by remote control via the control circuit, and by means of which a reverse friction wheel, which is connected coaxially to the reverse winding spindle, can be driven in the second mode when the supporting device which has been moved towards a reverse operating position via the actuating device in that the relevant control member has been set to its forward-active position, and the motor has been started in its reverse direction of rotation by remote control via the control circuit, and which in the first mode is kept disengaged from the forward friction wheel by separate blocking means when the supporting device for the drive mechanism, which has been moved towards a reverse operating position via the actuating device in that the relevant control member has been set to its reverse-active position by hand, and the motor has been started in its forward direction of rotation by the control member which has been set to its reverse-active position.

7. A dictation machine as claimed in claim 6, characterised in that the friction-wheel carrier is formed by a lever which is pivotable about a pivot which extends parallel to the drive shaft, there is provided an intermediate carrier for the friction-wheel carrier, which intermediate carrier is pivotable about the drive shaft and pivotally supports the friction-wheel carrier, and a spring acts upon the intermediate carrier and upon the friction-wheel carrier to tension the two said carriers relative to one another, which spring determines the pressure with which the intermediate friction wheel which is rotatably supported on the friction-wheel carrier, is kept pressed against the drive shaft.

8. A dictation machine as claimed in claim 7, characterised in that the separate blocking means for keeping the intermediate friction wheel disengaged from the forward friction wheel comprise an actuating projection of the actuating device, which projection is adapted to cooperate with the intermediate carrier for the friction-wheel carrier.

9. A dictation machine as claimed in claim 8, characterised in that the lever provided as the friction-wheel carrier has the shape of a frame and comprises two lever portions which extend transversely of the drive shaft and in each of which a shaft end is rotatably supported for the double support of the intermediate friction wheel.

10. A dictation machine as claimed in claim 9, characterised in that the movable supporting device for the drive mechanism is formed by a lever which is pivotable about a pivot extending parallel to the drive shaft of the drive mechanism and which has the shape of a frame and comprises two lever portions which extend transversely of the drive shaft and in each of which the drive shaft is rotatably supported for the double support of said shaft.

11. A dictation machine as claimed in claim 10, characterised in that the intermediate wheel of the drive mechanism is constructed as a pulley, a further pulley is rotationally locked to the shaft of the motor and the two pulleys (92, 93) are coupled in driving engagement by a belt wrapped around the two pulleys.

12. A dictation machine as claimed in claim 11, characterised in that there is provided a positioning stop adjacent the supporting device for the drive mechanism when said device is in its rest position, against which stop the supporting device is urged under the influence of the tension of the belt to define the rest position of said supporting device.

13. A dictation machine as claimed in claim 4, characterised in that the manually switchable inhibit switch is arranged in the socket provided for receiving the plug terminating the connection lead of the foot-switch unit and the inhibit switch arranged in the socket can be changed over by means of the plug when the plug is inserted by hand to obtain the second mode.

* * * * *